(12) United States Patent
Kim et al.

(10) Patent No.: US 10,155,848 B2
(45) Date of Patent: *Dec. 18, 2018

(54) SUPERCRITICAL CARBON DIOXIDE MORPHOLOGICALLY MODIFIED ACID-BASED HALLOYSITE CATALYST

(71) Applicant: KOREA PTG CO., LTD, Ulsan (KR)

(72) Inventors: Hyung Ju Kim, Irvine, CA (US);
Hwan Bock Lee, Gyeonggi-do (KR);
Jung Keun Lee, Ulsan (KR)

(73) Assignee: KOREA PTG CO., LTD., Ulsan (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/908,998

(22) Filed: Mar. 1, 2018

(65) Prior Publication Data

US 2018/0282479 A1 Oct. 4, 2018

Related U.S. Application Data

(62) Division of application No. 15/478,763, filed on Apr. 4, 2017, now Pat. No. 9,982,092.

(51) Int. Cl.
*C08G 65/26* (2006.01)
*C08G 65/20* (2006.01)

(52) U.S. Cl.
CPC ......... *C08G 65/2615* (2013.01); *C08G 65/20* (2013.01); *C08G 65/2657* (2013.01)

(58) Field of Classification Search
CPC . C08G 65/2615; C08G 65/2657; C08G 65/20
See application file for complete search history.

(56) References Cited

U.S. PATENT DOCUMENTS 6,207,793 B1 * 3/2001 Kim ...................... C08G 65/20
528/271

* cited by examiner

*Primary Examiner* — Yevgeny Valenrod
*Assistant Examiner* — Blaine G Doletski
(74) *Attorney, Agent, or Firm* — Hudak, Shunk & Farine Co., L.P.A.

(57) ABSTRACT

The efficient production of poly(tetramethylene ether) diacetate [PTMEA] or other diesters, from tetrahydrofuran [THF] is obtained utilizing an acid-based catalyst that is based on a morphologically reconfigured and Bronsted acidity enhanced halloysite derived from a preparation method of using naturally occurring halloysites. More specifically, the method relates to morphological modification of the internal pore structure of halloysites via supercritical carbon dioxide treatment directly applied onto the raw halloysite minerals, that yields highly synergistic and reproducible results of elimination of inaccessible and detrimental extra-small pores. PTMEA is readily converted to poly(tetramethylene ether) glycol (PTMEG) by a transesterification reaction

20 Claims, 17 Drawing Sheets

Table 2. Knudsen diffusivity of Oligomers with Polymerization Degree of n

| n-mer | Catalyst Pore Opening in Anstroms | | | | | | | | | | | |
|---|---|---|---|---|---|---|---|---|---|---|---|---|
| | 10 | 20 | 30 | 40 | 50 | 60 | 70 | 80 | 90 | 100 | 110 | 120 |
| 1 | 10.27 | 20.53 | 30.80 | 41.07 | 51.34 | 61.60 | 71.87 | 82.14 | 92.41 | 102.67 | 112.94 | 123.21 |
| 2 | 7.26 | 14.52 | 21.78 | 29.04 | 36.30 | 43.56 | 50.82 | 58.08 | 65.34 | 72.60 | 79.86 | 87.12 |
| 3 | 5.93 | 11.86 | 17.78 | 23.71 | 29.64 | 35.57 | 41.49 | 47.42 | 53.35 | 59.28 | 65.21 | 71.13 |
| 4 | 5.13 | 10.27 | 15.40 | 20.53 | 25.67 | 30.80 | 35.94 | 41.07 | 46.20 | 51.34 | 56.47 | 61.60 |
| 5 | 4.59 | 9.18 | 13.78 | 18.37 | 22.96 | 27.55 | 32.14 | 36.73 | 41.33 | 45.92 | 50.51 | 55.10 |
| 6 | 4.19 | 8.38 | 12.57 | 16.77 | 20.96 | 25.15 | 29.34 | 33.53 | 37.72 | 41.92 | 46.11 | 50.30 |
| 7 | 3.88 | 7.76 | 11.64 | 15.52 | 19.40 | 23.28 | 27.16 | 31.05 | 34.93 | 38.81 | 42.69 | 46.57 |
| 8 | 3.63 | 7.26 | 10.89 | 14.52 | 18.15 | 21.78 | 25.41 | 29.04 | 32.67 | 36.30 | 39.93 | 43.56 |
| 9 | 3.42 | 6.84 | 10.27 | 13.69 | 17.11 | 20.53 | 23.96 | 27.38 | 30.80 | 34.22 | 37.65 | 41.07 |
| 10 | 3.25 | 6.49 | 9.74 | 12.99 | 16.23 | 19.48 | 22.73 | 25.97 | 29.22 | 32.47 | 35.72 | 38.96 |
| 11 | 3.10 | 6.19 | 9.29 | 12.38 | 15.48 | 18.57 | 21.67 | 24.77 | 27.86 | 30.96 | 34.05 | 37.15 |
| 12 | 2.96 | 5.93 | 8.89 | 11.86 | 14.82 | 17.78 | 20.75 | 23.71 | 26.68 | 29.64 | 32.60 | 35.57 |
| 13 | 2.85 | 5.70 | 8.54 | 11.39 | 14.24 | 17.09 | 19.93 | 22.78 | 25.63 | 28.48 | 31.32 | 34.17 |
| 14 | 2.74 | 5.49 | 8.23 | 10.98 | 13.72 | 16.46 | 19.21 | 21.95 | 24.70 | 27.44 | 30.18 | 32.93 |
| 15 | 2.65 | 5.30 | 7.95 | 10.60 | 13.26 | 15.91 | 18.56 | 21.21 | 23.86 | 26.51 | 29.16 | 31.81 |
| 16 | 2.57 | 5.13 | 7.70 | 10.27 | 12.83 | 15.40 | 17.97 | 20.53 | 23.10 | 25.67 | 28.24 | 30.80 |
| 17 | 2.49 | 4.98 | 7.47 | 9.96 | 12.45 | 14.94 | 17.43 | 19.92 | 22.41 | 24.90 | 27.39 | 29.88 |
| 18 | 2.42 | 4.84 | 7.26 | 9.68 | 12.10 | 14.52 | 16.94 | 19.36 | 21.78 | 24.20 | 26.62 | 29.04 |
| 19 | 2.36 | 4.71 | 7.07 | 9.42 | 11.78 | 14.13 | 16.49 | 18.84 | 21.20 | 23.55 | 25.91 | 28.27 |
| 20 | 2.30 | 4.59 | 6.89 | 9.18 | 11.48 | 13.78 | 16.07 | 18.37 | 20.66 | 22.96 | 25.25 | 27.55 |
| 21 | 2.24 | 4.48 | 6.72 | 8.96 | 11.20 | 13.44 | 15.68 | 17.92 | 20.16 | 22.41 | 24.65 | 26.89 |
| 22 | 2.19 | 4.38 | 6.57 | 8.76 | 10.95 | 13.13 | 15.32 | 17.51 | 19.70 | 21.89 | 24.08 | 26.27 |
| 23 | 2.14 | 4.28 | 6.42 | 8.56 | 10.70 | 12.85 | 14.99 | 17.13 | 19.27 | 21.41 | 23.55 | 25.69 |
| 24 | 2.10 | 4.19 | 6.29 | 8.38 | 10.48 | 12.57 | 14.67 | 16.77 | 18.86 | 20.96 | 23.05 | 25.15 |
| 25 | 2.05 | 4.11 | 6.16 | 8.21 | 10.27 | 12.32 | 14.37 | 16.43 | 18.48 | 20.53 | 22.59 | 24.64 |

FIG. 16

SUPERCRITICAL CARBON DIOXIDE MORPHOLOGICALLY MODIFIED ACID-BASED HALLOYSITE CATALYST

FIELD OF THE INVENTION

The present invention relates to the efficient production of poly(tetramethylene ether) diester from tetrahydrofuran [THF] and an anhydride. Reaction with acetic anhydride yields poly(tetramethylene ether) diacetate [PTMEA], a precursor to poly(tetramethylene ether) glycol (PTMEG). An acid-based catalyst is utilized that is based on a morphologically reconfigured and Bronsted acidity enhanced halloysite derived from a naturally occurring halloysite. More specifically, the method relates to morphological modification comprising the internal pore structure of halloysites via supercritical carbon dioxide treatment directly applied onto the raw halloysite minerals, that yield highly synergistic and reproducible results of eliminating inaccessible and detrimental extra-small pores.

BACKGROUND OF THE INVENTION

Heretofore, nearly all the catalysts developed for the production of PTMEA from tetrahydrofuran (THF) were based on catalytic reaction over proton donor materials or in the presence of materials known to impart the Bronsted acidity to the reaction mixture. Among these catalysts, homogeneous catalysts that are present in the liquid phase have rarely been commercially exploited due to its prohibitive cost of the catalytic material as well as the inherent difficulty associated with the separation and recovery of the liquid-phase catalyst from the liquid product mixture. Therefore, the most promising catalysts in the commercial large-scale production of PTMEA have been of the heterogeneous type and commonly based on the natural halloysite mineral which is basically an aluminosilicate mineral with its $SiO_2$-to-$Al_2O_3$ ratio being close to 2.0. The inherent Bronsted acidity of the aluminosilicate mineral becomes the highest when the $SiO_2$-to-$Al_2O_3$ ratio is at or close to 2.0, which is theoretically attributable to the electron distribution and electronic stabilization of the mineral's crystalline lattice. Even though zeolite and other zeolite-like minerals are also based on aluminosilicates with silica and alumina in varying ratios and these types of minerals can also be synthesized, they have not been effectively used as the catalysts for the production of PTMEA due to multiple reasons that include: the high cost; the lack of other trace mineral matters that also contribute to the catalyzing Bronsted acidity; the unfavorable morphological structure involving pores and internal surface area, and more. Some of the prior efforts, including the Korea PTG Company's, involved doping or impregnation of synergistically positive mineral ingredients (such as hematite, other transition metal compounds, sodium salts, potassium salts, magnesium salts, calcium salts, etc.) onto the conventional halloysites in order to increase the Bronsted acidity of the resultant catalyst. However, their overall effects on the process efficiency of the polymerization of poly(tetramethylene ether) diacetate [PTMEA], a precursor to PTMEG, have been largely inconclusive, or minimally enhancing in certain areas but detrimental in other aspects of the process and product quality. Thus, the catalysts of the present invention are generally free of any zeolites. That is, if utilized, the amount of zeolite is generally less than about 10% by weight, desirably less than about 5% by weight, preferably less than about 2% by weight, and preferably nil, that is no zeolite is utilized based upon the total weight of the halloysite catalysts.

Poly(tetramethylene ether) glycol [PTMEG] is also known as polytetrahydrofuran (polyTHF) or poly(tetramethylene oxide) since a starting material of tetrahydrofuran (THF) is typically polymerized over an acid catalyst. Prior art before 1997 for polymerization of tetrahydrofuran (THF) to poly(tetramethylene ether) glycol (PTMEG) is described in U.S. Pat. No. 6,207,793 (by Sung-Il Kim; assigned to Korea PTG Co.), hereby fully incorporated by reference.

U.S. Pat. No. 6,207,793 teaches the method and steps of polymerization over a halloysite catalyst and also teaches how to prepare the halloysite catalyst using certain types of naturally occurring mineral of halloysite, more specifically Korean halloysite. The role of the halloysite catalyst in this polymerization process is that it serves as a long-term and abundant source and donor of Bronsted acidity, i.e., supplying necessary proton ($H^+$) to catalyze the desired reaction of polymerization of THF to polyTHF. To expedite this specific polymerization reaction, a small amount of alkyl anhydride such as acetic anhydride [$(CH_3CO)_2O$] can also be added to the reaction mixture. The amount of acetic anhydride that is used in the reaction mixture ranges between 0 to 20% of the starting amount of THF, more preferably 2-10%. The role of acetic anhydride is similar to that of an initiator in the case of free radical addition polymerization. If acetic aldehyde is added in the reaction mixture, the polymeric product from the polymerization reaction step would be poly(tetramethylene ether) diacetate [PTMEA], which is further converted into poly(tetramethylene ether) glycol [PTMEG] upon reaction with methanol. This invention is pertinent to the first step of THF polymerization and its catalyst.

Natural halloysites have a very large population of extra-small pores whose pore opening dimension is smaller than 20 Å. These tiny pores contribute to a large amount of internal surface area that could be useful when a gas phase reaction is to be promoted or catalyzed. However, such extra-small pores are dimensionally too small and largely inaccessible or impenetrable for large molecules that are typical for liquid phase chemical reactions involving growing polymers as in the case with the polymerization of PTMEA a precursor to PTMEG. In such a case, the dimension of growing molecules such as oligomers and polymers can easily exceed that of the pore opening, thereby creating an undesirable (in fact, disastrous) situation where larger polymer molecules get permanently entrapped inside the pores. Some of the molecules would be still growing and/or trying to grow further inside this tight space. The consequences of such improper growth and inhibited/prohibited diffusion of product molecules render nontrivial causes for a significant loss of and a diminishing effect on the catalyst activity, a waste in raw material, a shorter catalyst life, uneven polydispersity of product polymer, mechanical weakening and eventual structural breakdown of the catalyst, potential formation of high molecular weight gel, and more. Computation of molecular dimensions of oligomers is attached as Example 1. It explains why the existence of very small micropores in the catalyst is detrimental for the current process. This is somewhat contrary to the general thoughts about catalysts. It also signifies the effectiveness of the supercritical $CO_2$ pretreatment, which is a main body of this invention.

The large population of extra-small inaccessible pores in the conventional halloysite catalyst also affects the efficiency of the acid wash ion exchange step by significantly slowing down the ion exchange process as well as resulting in grossly insufficient and inefficient surface coverage of Bronsted acid sites.

While halloysites, particularly Korean halloysites (only from a specific region of South Korea), after the acid wash ion exchange treatment, have been successfully exploited in commercial production of PTMEA/PTMEG at the Korea PTG production facilities (Ulsan, Korea), using the process technology based on its own patent of U.S. Pat. No. 6,207,793, the following areas have been identified as the areas requiring significant improvements and/or critical technological solutions:

1. Development of more efficient catalysts for faster polymerization reaction;
2. Smaller reactor volume required for lower capital and operational cost that leads to enhanced profitability;
3. Achieving higher product quality and better process controllability.
4. Raw material flexibility and resource diversification allowing for the use of worldwide halloysite minerals beyond the high-cost Korean halloysite that is currently being used;
5. Preparation of catalyst pellets possessing superior mechanical strength and attrition resistance in harsh reaction environments;
6. Allowing long-term reusability of the catalyst, and,
7. Achieving enhancement of overall process efficiency and profitability.

SUMMARY OF THE INVENTION

Therefore, the current invention that effectively and uniquely converts the extra-small inaccessible pores that are dominantly abundant in original halloysites into fully accessible medium-sized pores with evenly distributed Bronsted acidity is novel and unexpected in view of the prior art. It is significantly and uniquely superior to the current art of the catalytic polymerization technology of PTMEA/PTMEG. If supercritical fluid treatment were applied to micro- and nano-porous minerals such as zeolite and montmorillonite (MMT), the internal surface area of these minerals would be increasing due to the opening and creating additional tiny pores. Therefore, the current result of surface area reduction and creation of larger pores at the expense of extra-small pores is very much unexpected and surprising.

The resultant effect of said supercritical pretreatment on halloysite minerals in terms of the morphological shift of pore structure in the experimentally observed direction was totally unexpected because in most micro- and nano-structured materials such as zeolite, clay and metallic catalysts, supercritical $CO_2$ treatment usually opens up more numbers of even smaller pores, thus increasing the internal surface area, simply by unplugging impurities out of the these clogged small pores. A decreasing result in specific surface area was totally unexpected and never reported in the literature. What is happening with naturally occurring halloysite is that supercritical-treatment is bringing down imperfect and pseudo-walls of parasite pores created in the main pores of the mineral matter due to multiple occurrences of volcanic actions (obviously hundreds of million years apart between them). Furthermore, said supercritical carbon dioxide pretreatment results on the halloysite mineral were very consistently reproducible.

It was also found that the supercritical carbon dioxide pretreatment method for Korean halloysite was equally applicable to New Zealand halloysite that was previously deemed unsuitable for use in the PTMEA polymerization process. The principal reasons for the unsuitability of New Zealand halloysite as the conventional catalyst for PTMEA polymerization were due to the severe difficulty to achieve efficient and sufficient ion exchange as well as the inability to make and maintain a mechanically strong catalyst pellet. The catalyst prepared using the supercritically pretreated New Zealand halloysite based on the current invention was found to be as effective as Korean halloysite, thus effectively addressing to the raw material flexibility issue while overcoming all of the aforementioned technological shortcomings.

The present application relates to a process for making a morphologically modified acid-based halloysite catalyst, comprising the step of subjecting a halloysite catalyst to a supercritical carbon dioxide treatment.

BRIEF DESCRIPTION OF THE DRAWINGS

FIG. 16 shows Table 2. Knudsen diffusivity of Oligomers with Polymerization Degree of n.

DETAILED DESCRIPTION OF THE INVENTION

The present invention relates to a novel preparation method of the halloysite catalyst by inducing morphological and microstructural changes to take place inside the particle structure of the halloysite mineral via controlled supercritical carbon dioxide treatment onto raw halloysite minerals. Upon exposure of raw halloysite minerals in a powder form to the temperature and pressure controlled environment of supercritical carbon dioxide (sc-$CO_2$), it was found that significant changes and transformation of pore size distribution (PSD) in the halloysite particles were obtained. This experimental finding was verified and substantiated on a very consistent and reproducible basis using Micromeritics' Accelerated Surface Area and Porosimetry System (ASAP) Model 2020. The observed shift in the PSD may be explained as: extra-small pores whose pore opening dimension is smaller than 20 Å (Angstroms) have essentially disappeared, i.e. free of, via collapse of pseudo-walls of such pores as well as interlayer exfoliation, thereby creating larger pores that are of medium size and generally of a cylindrical shape, in a range of an average diameter of from about 50 Å to about 500 Å, desirably from about 125 Å to about 250 Å.

The sources of halloysite minerals of the present invention generally are found in nature as a clay. Halloysites generally have the formula $Al_2Si_2O_5(OH)_4 \cdot 2H_2O$ and exist throughout the world can be utilized, where the ratio of $SiO_2$ to $Al_2O_3$ is desirably from about 1.5 to about 5.0, desirably from about 1.7 to about 3, and preferably from 1.8 to about 2.3, and most preferably about 2.0. Generally New Zealand halloysites are desired with Korean halloysites being preferred.

The fact that surface area reduction and creation of larger pores at the expense of extra-small pores was determined in a manner as set forth in Example 1, hereinafter.

Figure 1:
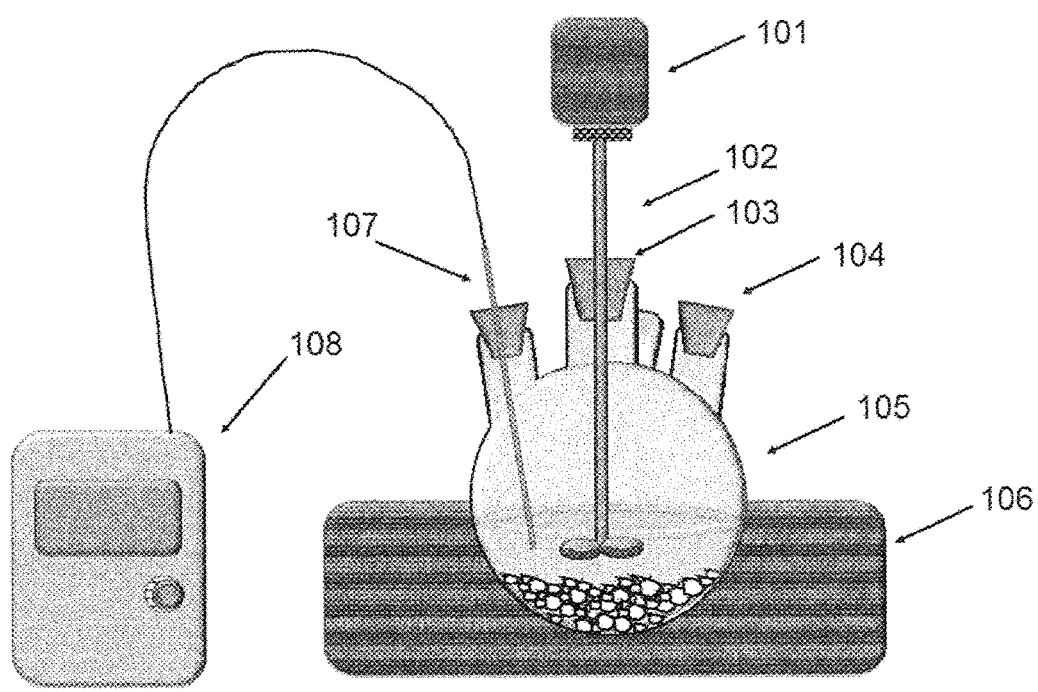
FIG. 1 is a schematic of batch polymerization reactor system.

One simplified embodiment or batch method of making the morphologically modified halloysite catalysts of the present invention is set forth in FIG. 1 wherein 101 relates to an electric stirrer, 102 is a Teflon impeller, 103 is a Teflon impeller seal, 104 is a silicone stopper, 105 is a four-necked round bottom flask, 106 is a heating mantle, 107 is a thermocouple, and 108 is a temperature controller. FIG. 1 was used for polymerization experiments using the halloysite catalysts. Both supercritically treated and untreated catalysts were experimentally run for polymerization reactions and the results were compared. The experimental procedures using the batch polymerization reactor system is explained in Example 5.

Figure 6:
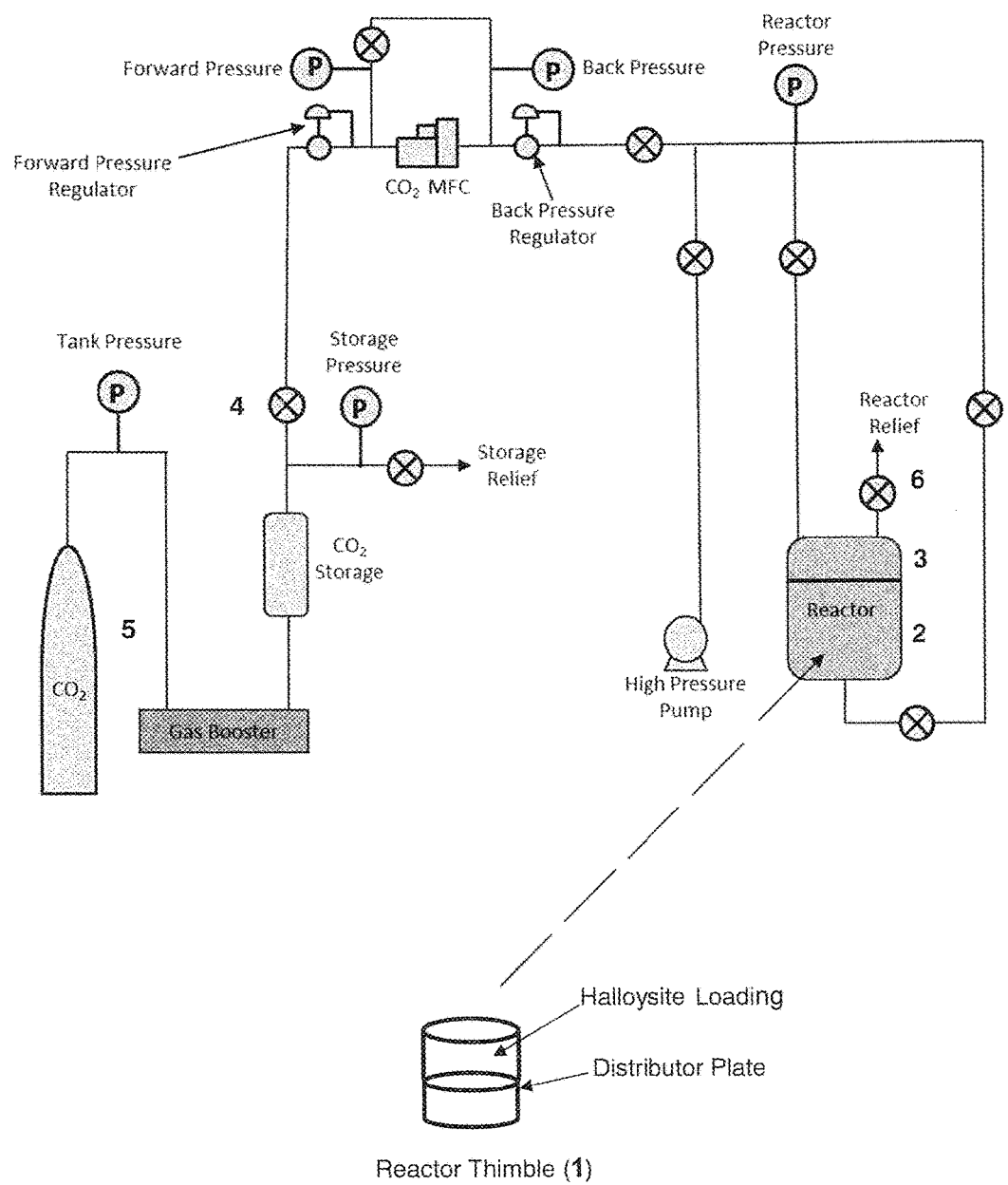
FIG. 6 is a schematic of supercritical $CO_2$ catalyst modification system for halloysites that can be operated in both a dynamic and static mode.

Generally, the morphologically modified halloysite catalysts of the present invention can be commercially made as set forth in the reactor system "R" of FIG. 6. FIG. 6 is a supercritical fluid treatment reactor system that is used for supercritical $CO_2$ modification of halloysite. The supercritically treated halloysite also undergoes ion exchange acid wash using a standardized acid wash procedure. The supercritical $CO_2$ treatment procedure using the system (FIG. 6) is generally explained in more detail in Example 2.

With respect to the overall supercritical process, halloysites, desirably in the form of particles, are placed in a reactor 10 that is generally non-corrosive such as stainless steel, e.g. 316, and is capable of handling high pressures up to about 5,000 psi and temperatures up to about 575° C. The amount of the halloysite added to reactor 10, having an internal volume of about 1 liter, can vary with a typical loading being approximately 200 to about 250 grams per batch. The supercritical temperature can range from about 120° C. to about 320° C., desirably from about 200° C. to about 290° C., and preferably from about 250° C. to about 265° C. or most preferably about 260° C. The pressure can range from about 1,200 to about 3,000 psi, desirably from about 1,300 to about 2,000 psi, and preferably about 1,400 to about 1,700, and most preferably about 1,500 psi. Normal time of the supercritical reaction conditions is generally from about 1 to 10 hours, desirably from about 2.5 to about 8 hours, with about 3 hours being preferred. Temperatures lower than 200° C. or higher than 300° C. were found to be substantially less effective, while the pressure effect was relatively insignificant as long as the treatment pressure was maintained higher than 1,350 psi. Optimal reactor conditions were found to be about 260° C. at 1,500 psi for approximately 3 hours.

Within the metes and bounds of the above ranges, the halloysite catalyst of the present invention can be optimized with regard to supercritical treatment conditions as set forth in Example 3.

The treatment of the halloysite catalyst can either be a static mode or a dynamic mode with a static mode generally being preferred.

"Static mode" means no $CO_2$ gas leaves the treatment reactor system by keeping the outlet valve closed.

"Dynamic mode" allows the $CO_2$ gas to slowly bleed out of the reactor by keeping both inlet and outlet valve open. Controllable metering valves are used in such cases to maintain the constant pressure. We have found that a static mode is superior from the material conservation standpoint and also based on its more precise control of system's pressure and temperature.

The preparation of the modified halloysite catalyst of the present invention produces at least the following morphological changes, and shifts.

Figure 3:
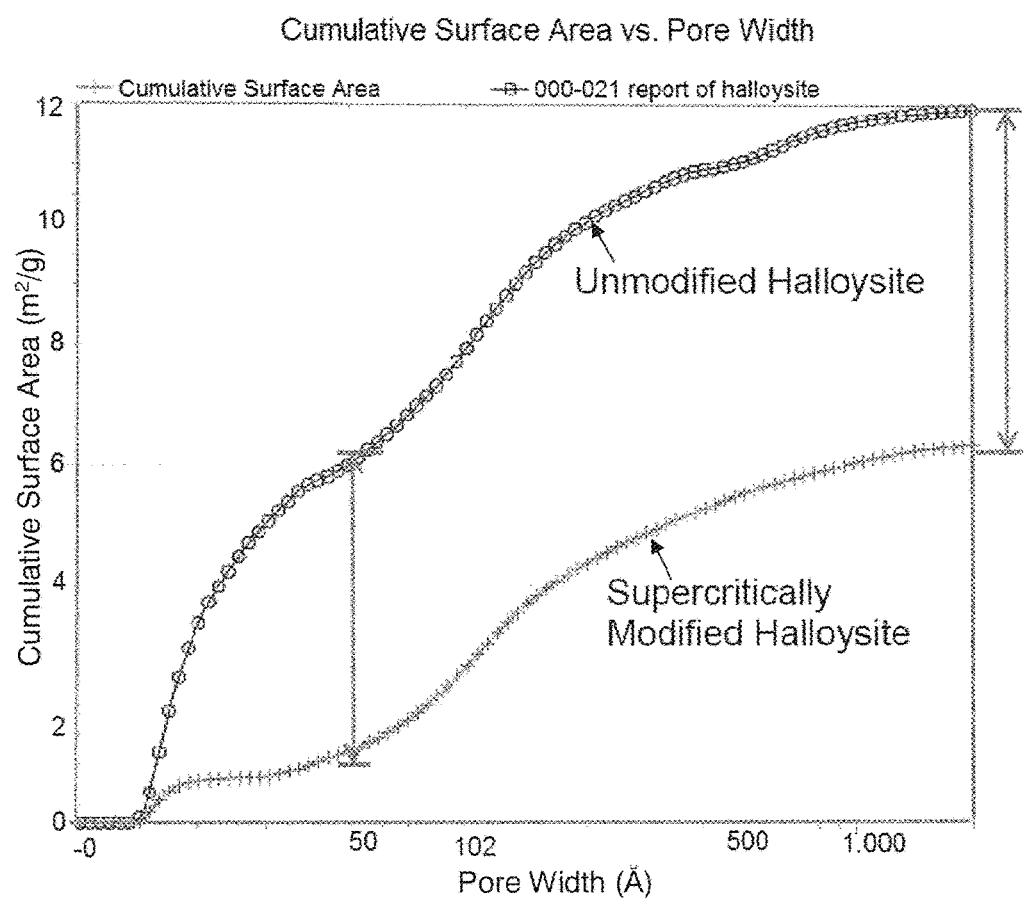
FIG. 3 shows the effect of supercritical fluid treatment of halloysite with respect to pore size and surface area obtained from an Accelerated Surface Area and Porosimetry System (Micrometrics ASAP™ 2020)

A substantial decrease in the total internal surface area due to the disappearance of the surface areas contributed by tiny inaccessible pores that would be anyway unavailable for the desired chemical reaction, as shown in FIG. 3. That is, the total internal area of the modified halloysite catalysts of the present invention is generally from about 2 to 60 $m^2/g$, desirably from about 3 to 20 $m^2/g$, and preferably from about 4 to 12 $m^2/g$ an ASAP 2020 instrument.

FIG. 3 also relates to the effect of the supercritical fluid treatment of halloysite particles by carbon dioxide with respect to reduced internal surface area as noted in Example 1. FIG. 3 verifies the disappearance of inaccessible surface area mainly due to the disappearance the inaccessible small pores in the supercritically modified halloysite. As shown in FIG. 3, reductions of at least 50% of the surface area were readily obtained. The average pore size diameter of the supercritically modified halloysites of the present invention is generally above 20 Å. That is, the modified halloysite catalysts are generally free of pore diameters of about 20 Angstroms or less. If any small pore diameters exist, desirably only about 5% or less, desirably about 2%, and preferably nil, that is none of the pore diameters are 20 Å or smaller. Rather, as previously noted, the average diameter of all pores within a modified halloysite catalyst of the present invention is generally from about 50 Å to about 500 Å, and desirably from about 125 Å to about 250 Å. The supercritically modified halloysite catalyst of the present invention resulted in the above-noted improvements such as enhanced reactivity, more efficient acid wash ion exchange process in terms of speed, penetration depth, improved catalyst strength, and so forth. This is because of the reduction of the inaccessible pores that are detrimental to the polymerization reaction due to the entrapment of monomers and oligomers inside the pores.

Figure 4:
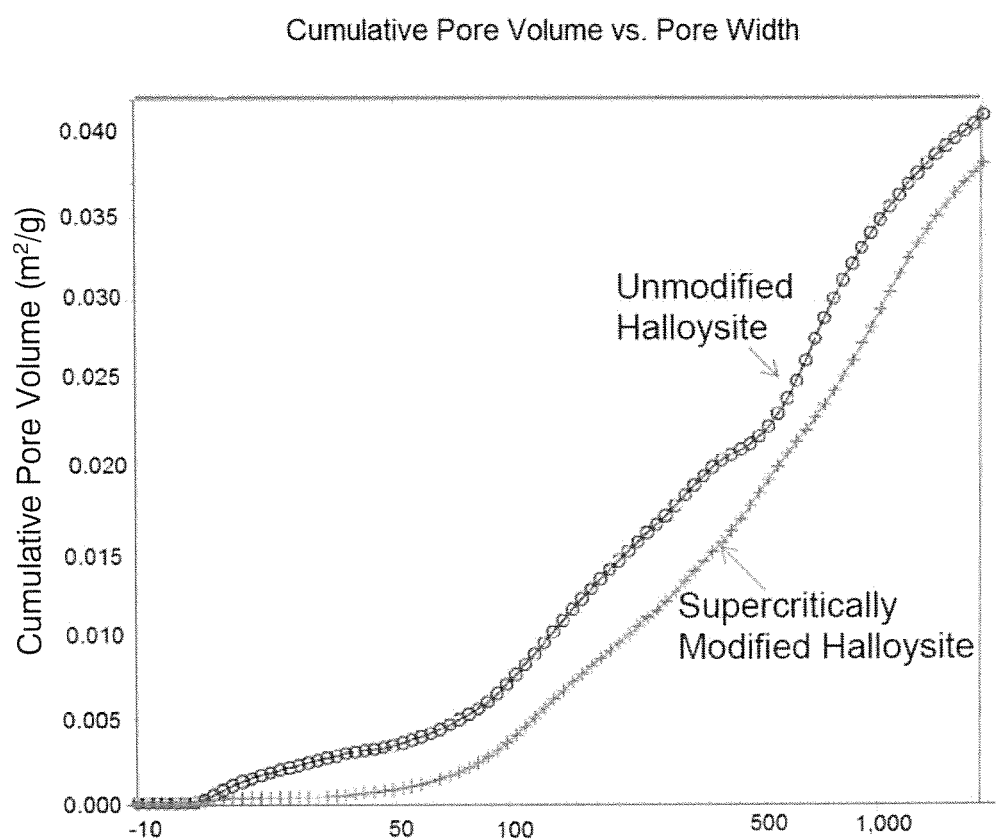
FIG. 4 relates to ASAP data showing disappearance of extra-small pores upon supercritical $CO_2$ treatment.

FIG. 4 shows supercritical treatment of cumulative pore volume vs. pore width (see Example 1), indicating that the pores were cleansed of geological humus or fine aggregates. A shift from an original multimodal pore size distribution (PSD) of untreated halloysite into a unimodal or near-unimodal pore size distribution (PSD) of treated halloysite, as shown in FIG. 4, is largely due to the coalescence of tiny pores into medium-sized accessible pores. The two types of catalysts were prepared following the exactly same basic preparation methods, i.e., ion exchange acid wash (including rinses in between), catalyst extrusion, and calcination (heat treatment). All identical steps and procedures were followed for both treated and untreated, as described in each separate step explanation. However, the only difference between the two was that one started with the SC treated halloysite while the other started with untreated halloysite, before going through acid wash, catalyst extrusion, and calcination. We simply call them sc-treated catalyst vs, untreated catalyst. The reaction conditions used were all comparable to each other with a clear objective of comparing between them, i.e., amount of reactant, amount of catalyst, amount of $Ac_2O$, T, the batch reaction time, impeller speed, and the reactor itself. Only the type of the catalyst was different in the reactor. Half of the halloysite catalysts was supercritically treated as set forth in Example 1 in Table 3.

Approximately 100 mg of an analyte was weighed out by difference into a volumetric bulb glassware designed for the Micromeritics ASAP 2020 instrument. A glass filler rod was added to the bulb as well to lower the necessary volume of air inside the bulb, and therefore increases the consistency of the results from the instrument. The sample was then degassed on the ASAP 2020 instrument which first includes an evacuation phase and then a heating phase.

Evacuation Phase Conditions:
Temperature Ramp Rate: 10.0° C./min
Holding Temperature: 90° C.
Evacuation Rate: 10 mmHg/s
Hold Pressure: 10 mmHg
Evacuation Time: 60 min
Heating Phase Conditions:
Temperature Ramp Rate: 10.0° C./min
Hold Temp: 350° C.
Hold Pressure: 10 mmHg
Heating Time: 2000 min After the degassing step, the sample is backfilled with pure Nitrogen and then analyzed with the analysis side of the ASAP 2020 instrument. First the nitrogen is reevacuated from the sample, then bursts of nitrogen are added to the sample tube with expected and actual pressures calculated from the instrument at near liquid nitrogen temperature isotherm. The analysis side of the instrument is set up with a liquid nitrogen cryogenic dewar.

Figure 5:
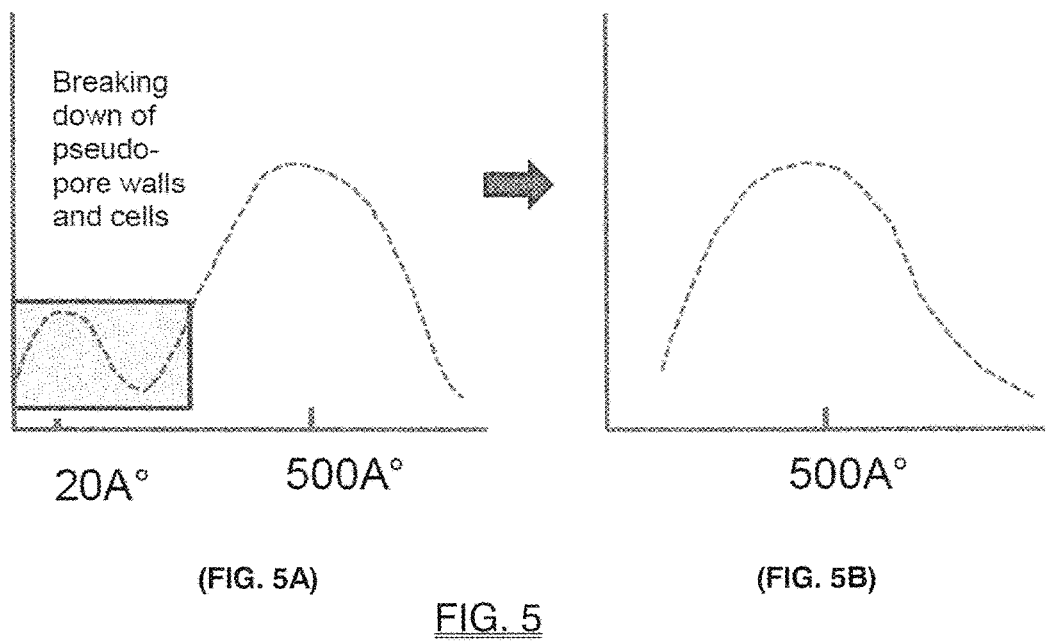
FIG. 5 shows an illustration describing the intraparticular shift from extra-small inaccessible pores (FIG. 5A) into medium-sized fully-accessible pores (FIG. 5B)

Some possibly relevant Analysis Conditions:
Initial Evacuation Time: 0.1 hrs (6 mins)
Maximum Equilibration Time: 10 mins
Relative Pressure Tolerance: 5%
Absolute Pressure Tolerance: 5 mmHg
FIG. 5 illustrates the shift from a bimodal to a unimodal pore size distribution.

In summary, the morphological change and shift, in the specific but synergistic direction of increasing pore dimensions, of micro- and nano-porous materials such as halloysites is an unexpected result due to the supercritical process of the present invention. In other words, the morphological change in the pore structure of halloysite mineral was unexpectedly found to have a number of very profound and crucially beneficial effects on the catalyst prepared using the supercritically pretreated halloysite as well as on the resultant catalytic polymerization process for PTMEA, when compared to the catalyst prepared following the conventional preparation method using untreated halloysite, i.e., the conventional halloysite catalyst.

The advantages of this invention are realized and embodied in the following two areas and aspects. 1) A superior quality catalyst, overcoming all the short-comings of the conventional halloysite catalyst, when it is prepared using the supercritically treated halloysite; and 2) The resultant process enhancements using said catalyst are clearly demonstrated by: possessing a significantly higher (faster) catalytic reactivity; providing a more flexible and wider window for choice of starting halloysite materials allowing for worldwide compositionally-different and geologically distinct halloysites; and achieving a higher quality of the polymer product.

More specifically, the advantages and improved properties of the invention are detailed below.

1. Significantly enhanced reactivity (about 2-5 times and desirably about 2 to 10 times faster reaction speed at typical operating temperatures and at typical extent of conversion) when using said catalyst prepared based on said supercritically treated halloysite [FIGS. 7 and 8] as compared to heretofore conventional halloysite catalysts as set forth in U.S. Pat. No. 6,702,793. The Control as well as the catalysts (Example 1 of Table 2) of the present invention were exactly the same except for the supercritical treatment step of the present invention.

2. More efficient acid wash ion exchange process in terms of its speed (1.5-4 times faster) and the extent of ion exchange for added Bronsted acidity (reaching over 95% of the available pores and surface areas of said halloysite). The acid wash speed depends upon the speeds of permeation and pore diffusion of the aqueous acid solution. While permeation speed depends on the halloysite particle sizes, the pore diffusion (internal wetting) speed depends upon the internal pore diameters. In an ion exchange acid wash step, this speed difference is noticed and measured by the combined soaking and draining speed. Slower ion exchange step would represent both less efficient (and incomplete) ion exchange and higher catalyst preparation cost. The acid wash treatment for ion exchange of a halloysite catalyst is set forth in Example 4 hereinbelow.

3. Elimination of inaccessible (and wasteful) extra-small pores in the catalyst that inhibit free diffusion of reactant and oligomeric products and shift/conversion of these inaccessible pores into fully accessible pores 4. Alleviated moisture sensitivity of said catalyst based on supercritically treated halloysite when compared to the conventionally prepared catalyst
5. Ability to prepare a mechanically stronger catalyst that is superbly resistant against attrition and fine powder formation [FIGS. 9, 10, and 11]
6. No wasteful loss of halloysite powders during the catalyst preparation stage as well as during the reactor operation stage
7. Significant increase in the catalyst life and its reusability in the commercial production process (2-5 times)
8. Enhanced product quality evidenced by the uniformity of product specifications, color of resultant polymeric product, and controllable polydispersity precisely to the desired specification.

Polymerization of Tetrahydrofuran (THF) or 3-methyl tetrahydrofuran utilizing the morphological reconfigured and Bronsted acidity enhanced halloysite catalyst to produce poly(tetramethylene ether) diacetate (PTMEA).

A polymerization reaction scheme is as follows.

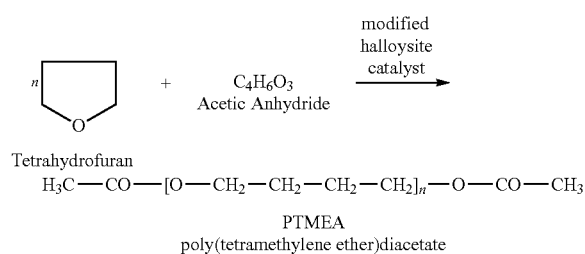

where n is from 4 to about 60; desirably from 10 to 40, and preferably from 20 to 30.

More broadly, the polymerization reaction scheme can be as follows:

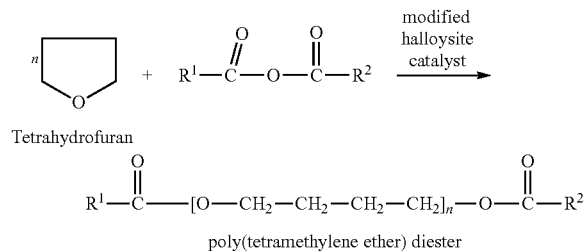

where n is from 4 to about 60; desirably from 10 to 40, and preferably from 20 to 30; and
where $R^1$ and $R^2$, independently, have from 1 to 6 aliphatic or aromatic carbon atoms, and preferably have from 1 to 4 aliphatic or aromatic carbon atoms.

Typical reaction conditions for polymerization of tetrahydrofuran include the polymerization reaction temperature of from about 30° C. to about 65° C., desirably from about 35° C. to about 65° C., and preferably from about 40° C. to about 60° C. The reaction preferably is carried out a tt atmospheric. Since the normal boiling point of THF is 66° C., the maximum reaction temperature under atmospheric pressure must be kept lower than 66° C. While various aliphatic or aromatic anhydrides can be utilized having a total of from $C_4$ to about $C_{14}$ atoms, $C_4$ to $C_{10}$ aliphatic or aromatic anhydrides are preferred, with acetic anhydride being highly preferred.

The temperature of the polymerization reaction also affects the yield of reaction as well as the product specifications, including the average molecular weight of the polymer/oligomer, molecular weight distribution (MWD) commonly represented by the polydispersity index (PD=weight average MW/number average MW).

The formed products of PTMEA are in oligomeric forms, i.e., lower molecular weight polymers whose number average MW ranges typically 500 to 5000, more commonly 650 to 4000, and preferably from about 1,000 to about 3000. A narrower molecular weight distribution (i.e., lower polydispersity of 1.5-5.0 and preferably from about 2.0 to about 4.0) product is preferred for the present invention as a higher quality product. Thus, the polydispersity of the present invention has a range from about 1.5 to about 6.0, desirably from about 1.8 to about 5.0, and preferably from about 2.0 to about 4.0.

As for the halloysite catalysts, higher catalytic activity is most highly desired, since the reaction speed with a highly active catalyst would be faster, thus requiring a smaller reactor volume and/or shorter reaction time for the same production rate. Thus, a higher molecular weight PTMEA product can be produced in a shorter period of time. Furthermore, good catalyst should not leave any objectionable color or tint on the product polymer, nor create/generate powdery catalyst fines and/or disintegrated residues which would make continuous operation of the polymerization reactor very difficult or interrupted. The catalyst should also be easily regenerated, if needed, via standard procedures of acid wash ion exchange followed by calcination and be repeatedly reusable without any detrimental effects (such as activity loss) for many years. Data setting forth the preparation of PTMEA according to the present invention wherein tetrahydrofuran was reacted with acetic anhydride are set forth in Examples 8 and 9 and FIGS. 11 and 12 wherein the reaction temperature, reaction time, and the like are set forth. It is noted that the reaction speed for the initial hours utilizing the modified halloysite catalysts of the present invention is easily two times faster. This is significant, since the reaction production is not run at equilibrium conversion, but rather at a substantially lower extent of conversion, i.e. in a shorter amount of residence time. With respect to comparative data concerning molecular weight distribution, polydispersity, and the like, improved products were obtained having a narrow molecular weight distribution and no undesirable color or tint.

Figure 7:
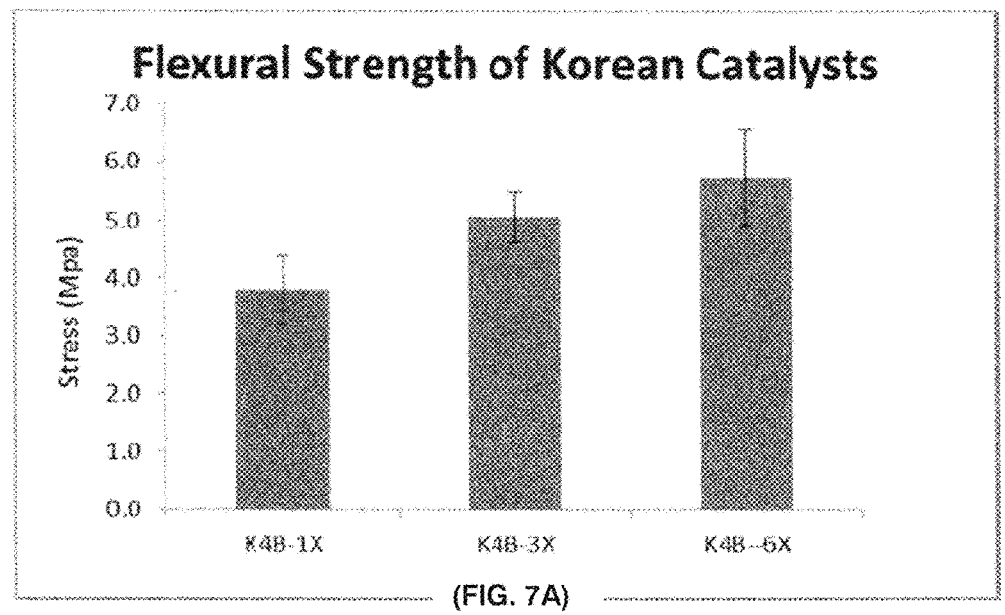
FIG. 7 shows the mechanical strengths of catalysts based on supercritically modified halloysites (Korean (FIG. 7A) and New Zealand (FIG. 7B) halloysites), flexural stress higher than 1.5 MPa has been found to be mechanically strong enough to be used as an attrition resistant catalyst in a continuous vertical column reactor operation. Catalyst whose flexural stress is as high as 11 MPa can also be produced by the present method.
Figure 7:
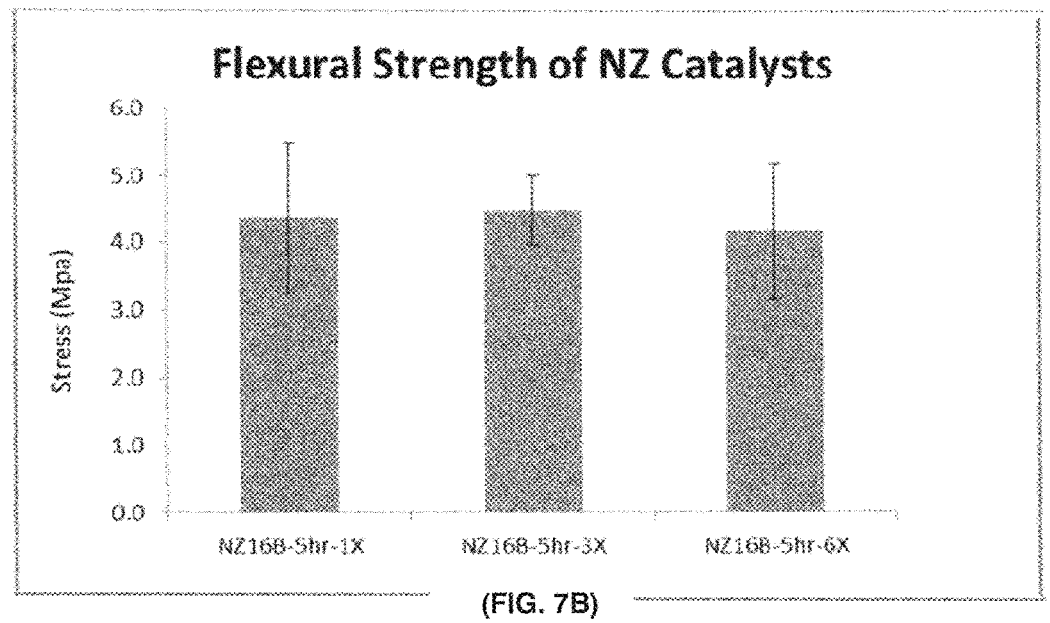

FIG. 7-A shows a comparison of the flexural strengths of the modified Korean halloysite catalysts. As mentioned before, 1×, 3×, and 6× represent the catalyst extrudates (pellets) of once through, 3-times through, and 6-times through, respectively. As shown in the figure, the flexural strength of 3× sample (5.1±0.4) was stronger than 1× sample (3.8±0.6) by 34%, while that of 6× sample (5.8±0.8) was stronger than 1× sample by 53%. The barrel length (1×) is 13.8 cm (5.44") long.

FIG. 7-B shows a comparison of the flexural strength of the modified New Zealand halloysite catalysts. As shown in the figure, the flexural strengths of New Zealand catalysts samples were nearly the same for 1×, 3×, and 6× extrusion cases. The strength of the New Zealand halloysite catalyst is also considered very good in the 4.2-4.5 MPa range. Relative independence of or indifference to the extrusion length implies that sufficient kneading was already achieved in the hand mixing stage of paste preparation. The catalyst designated by K4B-1× means that (a) the halloysite used for the catalyst preparation was Korean halloysite; (b) the halloysite was supercritically treated at 260° C. and 1500 psi (our optimal supercritical treatment condition); (c) the treated halloysite received acid wash ion exchange following Cat ID #4 procedure. By (b) and (c), the combined procedure is the same as that for Cat. ID #11; (d) −1× denotes the catalyst pellet was made by a single pass-through of the Bonnot extruder.

The catalyst designated by NZ16B-5 hrs-3× means that (a) the halloysite used for the catalyst preparation was New Zealand halloysite; (b) the halloysite was supercritically treated at 260° C. and 1500 psi (our optimal supercritical treatment condition); (c) the treated halloysite received acid wash ion exchange following Cat ID #16 procedure [added in the main text]; (d) 5 hrs means that the SC treatment was done for 5 hours instead of typical 3 hours; (e) −3× denotes the catalyst pellet was made by 3 passes-though of the extruder barrel of the Bonnot extruder. As apparent from FIG. 7, flexural strengths in excess of 3.0 MPa were found and the same were strong enough to be utilized in various vertical column reactor operations. Flexural stress as high as 11 MPa can also be produced by the present invention.

Figure 8:
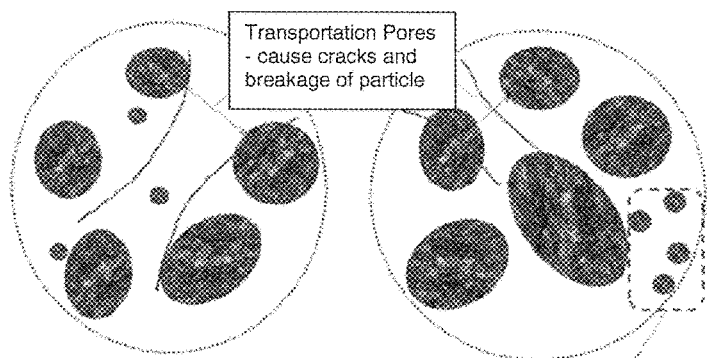
FIG. 8 shows the oriented (FIG. 8A and FIG. 8B) and reoriented particles (FIG. 8C) for mechanically stronger catalysts.
Figure 8:
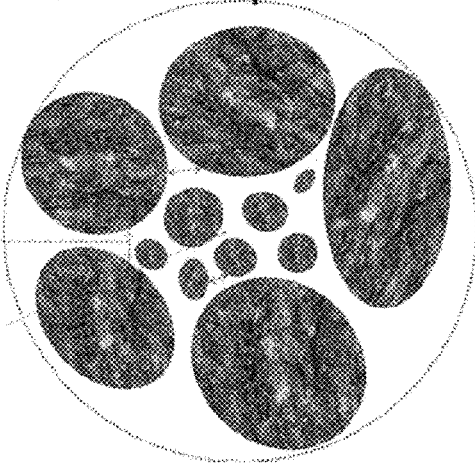

FIG. 8 relates to a drawing showing transportation pores that cause cracks and breakage of halloysite particles, top row, whereas the re-orientated halloysite particles made according to the present invention result in stronger particles and pellets, bottom row.

Figure 9:
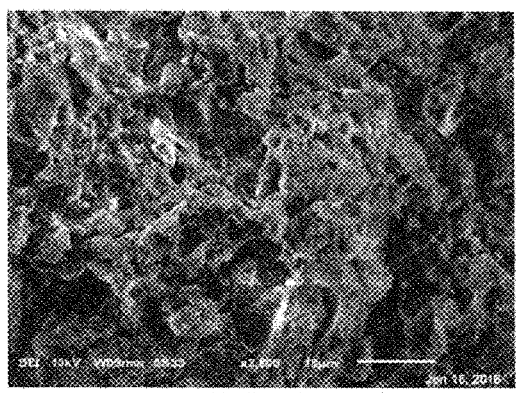
FIG. 9 shows the SEM photographs showing the patterns of particulate distribution of supercritically modified Korean halloysite catalysts with different levels of mixing in the Bonnot catalyst extruder, the last photograph shows the most compact and strong (non-brittle) catalyst pellet, (1×, (FIG. 9A) 3× (FIG. 9B), and 6× (FIG. 9C) denotes the catalyst prepared with one-pass of extruder barrel length, three-passes of extruder barrel, and six-passes of extruder barrel, respectively)
Figure 9:
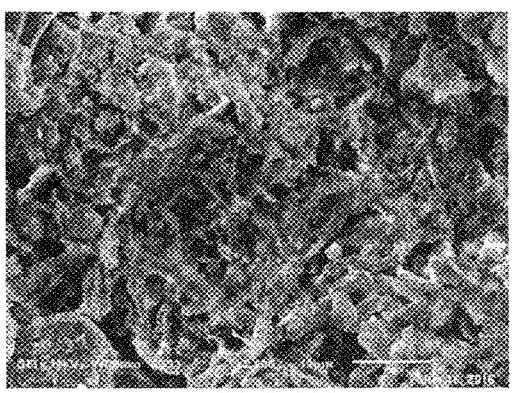
Figure 9:
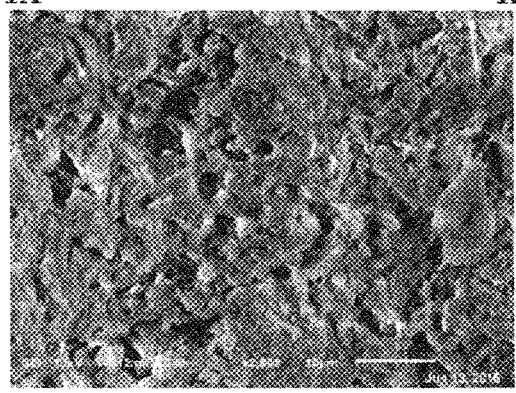

FIG. 9 relates to SEM photographs showing the patterns of particulate distribution of supercritically modified Korean halloysite catalysts with different levels of mixing in the Bonnot catalyst extruder. The last photograph shows the most compact and strong (non-brittle) catalyst pellet. (1×, 3×, and 6× denotes the catalyst prepared with one-pass of extruder barrel length, three-passes of extruder barrel, and six-passes of extruder barrel, respectively.

Figure 10:
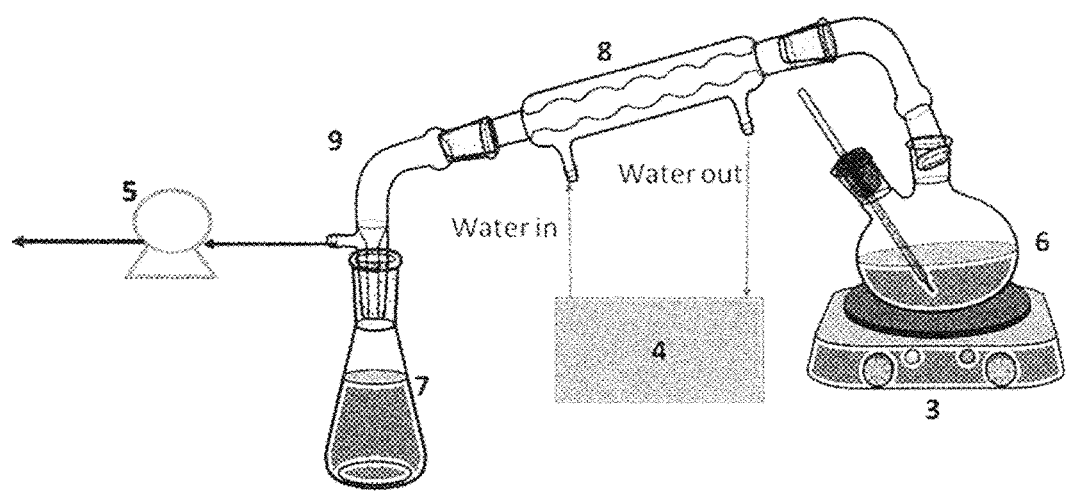
FIG. 10 shows a product separation system.

FIG. 10 is a Product Separation System wherein the desired product from the catalytic polymerization reaction is oligomeric PTMEA (liquid phase). Since the PTMEA oligomers are fully miscible with THF, the product has to be separated and isolated from the reactor content mixture which consists of unreacted THF, unreacted acetic anhydride, and oligomeric PTMEA. The product separation is accomplished using a distillation procedure based on the boiling point difference of each molecular species. See Example 6.

Figure 11:
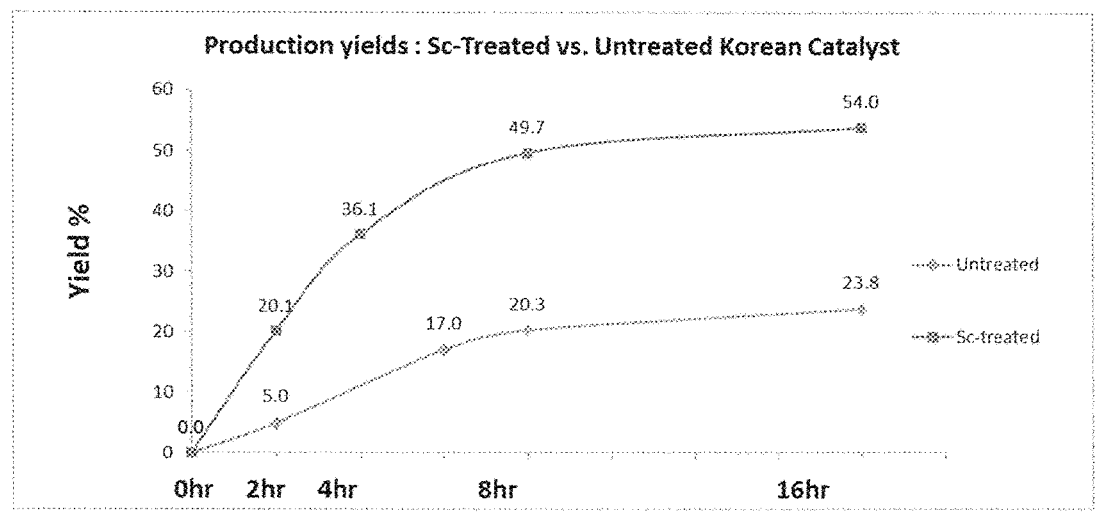
FIG. 11 shows the production yields of Supercritical-Treated vs. Untreated Korean Catalyst.

FIG. 11 shows the production yields of Supercritical-Treated vs. Untreated Korean Catalyst. See Example 8.

Figure 12:
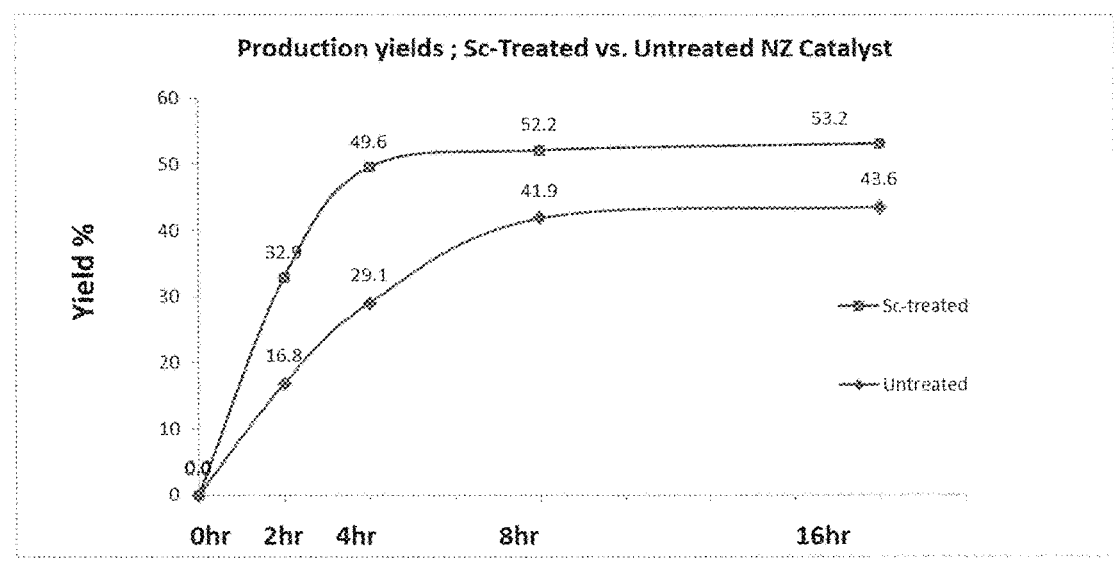
FIG. 12 shows the production yields of Supercritical-Treated vs. Untreated New Zealand Catalyst.

FIG. 12 shows the production yields of Supercritical-Treated vs. Untreated New Zealand Catalyst. See Example 9.

In the Examples of the present invention the molecular weight distribution with regard to PTMEA is determined by GPC analysis as set forth in Example 7.

As noted above, a primary use of the PTMEA polymers of the present invention is the reaction thereof with alcohols having from 1 to about 6 carbon atoms with methanol being highly preferred to yield PTMEG via a transesterification reaction with an alkali (Group 1) methylate catalyst with sodium methylate being highly preferred. The temperature of such reaction is generally from about 50° C. to about 85° C., desirably from about 60° C. to about 80° C., and preferably from about 65° C. to about 75° C., if methanol is used as the alcohol in the transesterification reaction. The reaction is also carried out at or close to atmospheric pressure. The number average molecular weight of such PTMEG polymers is directly dependent upon the number average molecular weight of PTMEA-oligomers used in this transesterification reaction, as shown in the reaction scheme.

The reaction scheme of the PTMEA to PTMEG is as follows:

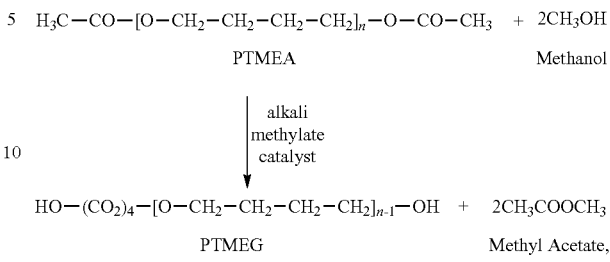

Figure 2:
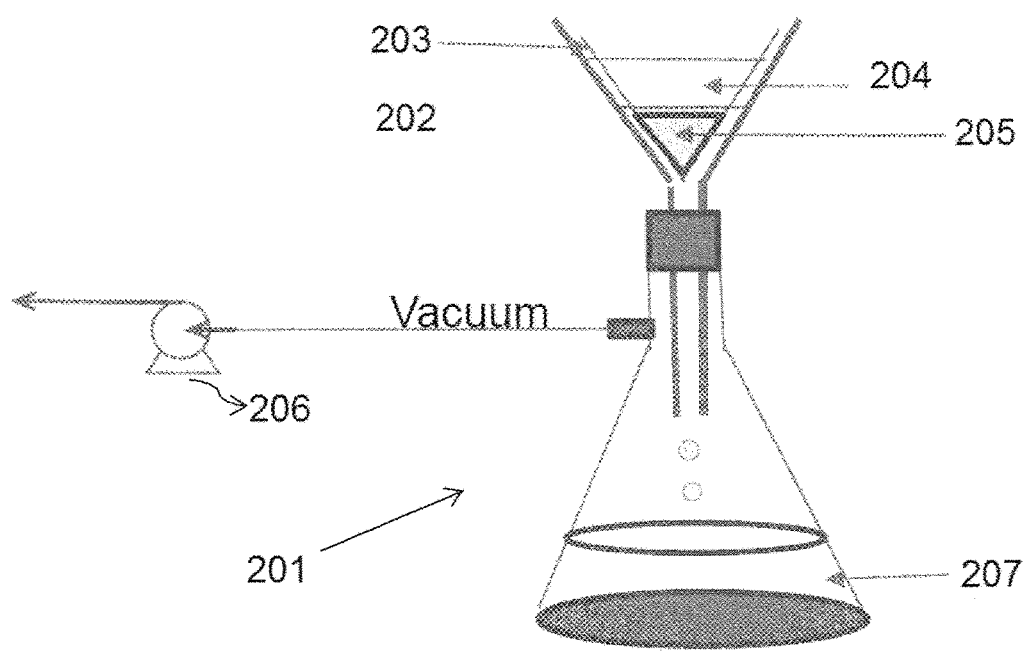
FIG. 2 is a schematic of acid wash ion exchange system.

As well known to those skilled in the art, with respect to activation/regeneration of the catalyst, various such procedures are well known to the art and to the literature and a schematic of such a system is shown in FIG. 2. The system comprises an Erlenmeyer flask 201 containing a separator funnel 202 thereon having filter paper 203, an ion exchange acid solution 204 that is added to the funnel that in turn contains the halloysite catalyst 205 to be activated/regenerated. Vacuum pump 206 sucks the ion exchange acid solution into the flask with filtrate solution 207 then accumulating at the bottom of the flask.

The morphological and/or reconfigured halloysites of the present invention can be subjected to various ion exchange acid wash procedures whereby they are regenerated and can be subsequently reused for later polymerizations. The halloysite catalysts of the present invention are expected to be repeatedly reusable without any detrimental effects, such as activity loss, for several years.

Extrusion of Supercritical Produced Catalyst Pellets

In order to make structurally strong and attrition resistant catalyst pellets of uniform dimensions, production method of extrudates (pellets) becomes a nontrivial issue. This is especially true, since any chemical binder or binding/gluing agent cannot be used in the final catalyst formulation. Also of significance is the preservation of intra-particle and inter-particle pores and openings without causing structural and morphological damage such as cell or pore wall collapse.

The catalyst pellets prepared in the present invention were extruded as 4 mmΦ cylinders using a catalyst extruder, Bonnot Catalyst Extruder (Desk-top Model). A conceivable merit of an extruder is in its uniform distribution of mechanical stress inside the extruder during the pellet shaping process. The "uniform stress distribution" is believed to give better structural and mechanical integrity to the pellet, which results in an enhanced attrition resistance by eliminating the potential presence of mechanically weak segments or "soft spots" throughout the entire geometry of the catalyst pellet. See Example 10.

Further, it was found that the length/diameter ratio of the commercial Bonnot extruder was not high enough to prepare a structurally strong and compact catalyst pellet of halloysite which has a large fraction of fine powdery particles of submicron in size. Therefore, the formulated catalyst paste was run through the extruder for a multiple number of passes, thus effectively increasing the paste travel length through the extruder barrel mixing zone. The original barrel length equipped in the Bonnot extruder was 13.8 cm. Thorough mixing resulted in bringing the ion-exchanged halloysite fines together (i.e., re-oriented and re-arranged) inside the pellet, shortening the interparticle distances among the fines, and essentially more compact and stronger pellet. See FIGS. 8 and 9 and Example 10.

This experimental finding makes certain halloysite samples (such as New Zealand halloysite) that were previously deemed unsuitable as the PTMEA catalyst raw material become both equally suitable and very useful. From the standpoint of the cost of the raw material halloysite and the availability of acceptable and effective halloysites, this by itself is also a discovery of novelty and significance.

Catalyst Calcination and Finishing Procedure for Hardening and Stabilization of Crystalline Structure Generally, the modified halloysite catalysts of the present invention can have numerous shapes and have been found to provide good strength for use as a catalyst provided that they are formed at low calcination temperatures, i.e. generally about 800° C. or less. Otherwise, the modified and formed halloysite catalysts are brittle and fragile and simply would break under slight pressure when in a catalyst form such as a pellet. By the term "pellet" it is meant generally a small amount of the modified halloysite catalyst of the present invention has been formed into any of several shapes and sizes, such as spherical, cylindrical, rectangular, and the like usually through the compression or extrusion of the modified halloysite catalysts. Thus, it was found that the catalyst finishing and calcination step is very important and is far more delicate than it simply appears to be.

Calcination at a very high temperature (T>850° C.) for halloysite is detrimental and should be avoided, since some of the mineral matters (alkali and alkaline earth metals) ooze, melt, or decompose at such a high temperature. Even if such mineral matters are present only in trace quantities in halloysite, they could affect the surface coverage of crystallites in the halloysite. Melting points of $Na_2CO_3$, $K_2CO_3$, and NaCl, as examples, are 851, 891, 801° C., respectively. The first two are likely trace minerals present in halloysite, while the third is less likely.

Slow ramping of the temperature and holding the sample at a constant and predetermined temperature for a prolonged time is important in order to give the crystalline structure a sufficient time to expand, shrink, and re-stabilize. See Example 11.

Generally, at least three ramping steps are required. The first step is generally keeping the extruded catalyst shape, for example pellets, by removing moisture and volatiles at a constant temperature, such as from about 100° C. to about 240° C., and preferably from about 105° C. or about 150° C. to about 200° C., for an extended period of time as from about 0.5 to about 3 hours, desirably from about 1 to about 2 hours, and preferably from about 0.75 to about 1.5 hours. Subsequent thereto a second heating step is utilized at an elevated temperature such as from about 550° C. to about 850° C. and preferably from about 600° C. or about 650° C. to about 800° C. for long periods of time such as from about 4 to about 16 hours and desirably from about 6 to about 12 hours with about 8 hours being preferred. Subsequent thereto, the pellets are maintained at a lower temperature such as from about 150° C. to about 250° C., and desirably from about 175° C. or about 180° C. to about 225° C. for about 1 to about 3 hours, desirably from about 1.5 to about 2.5 hours, with about 2 hours being preferred.

The first low temperature is for purging moisture bubbles and volatiles, the next elevated temperature is for ceramic formation and crystallization (or, recrystallization), and the final low temperature is for avoiding an overly rapid quenching cooling, recrystallization of low-melting minerals, and stabilization of crystalline structure.

The present invention will be better understood by reference of the following examples which serve to illustrate but not to limit the invention.

Example 1

Critical Dimension for Free Molecular Motions and Mobility Through the Pore Opening The critical dimensions for uninhibited mobility for monomers, dimers, trimers . . . , and grown oligomers can be estimated based on the computation of molecular dimensions of the n-mers (oligomers of polymerization degree of "n"). The reactant (THF) and product oligomers (PTMEA) remain in the liquid phase throughout the reaction process. Therefore, instead of using the mean free path of molecules (as in the case with gaseous molecules), the molecular sizes of n-mers can be directly compared to the pore mouth opening (i.e., pore diameter). The following general assumptions are made in the molecular computation:

1. Oligomers produced in the pores are linear, i.e., no branching.
2. The bond lengths for C—C and C—O bonds are 1.54 and 1.44 Angstroms respectively and the angle between two adjacent C—C bonds is 109°.
3. The temperature is 50° C.

Based on the computation of linear molecular dimensions of the PTMEA oligomers as a function of the degree of polymerization (n), as shown in Table 1, the average linear dimension of monomeric repeating unit is 4.9254 Å° and that for 20-mer is 120.63 Å°. Also shown in the table are diffusivity computation for both binary exchange diffusivity (Dab) and Knudsen diffusivity/pore diameter $$\left(\frac{D_{aK}}{d_p}\right).$$

TABLE 1

Molecular Dimensions of Oligomers (n-mers) and Diffusivity Calculation

| Degree of Polymerization n-mer | Molecular Length A° | Molecular Height A° | Molar Vol $\frac{cm^3}{mol}$ | Binary Diff Dab * 10⁵ $\left(\frac{m^2}{s}\right)$ | Knudsen Diffusivity $\frac{DaK}{\text{Pore Size}}$ | Remarks |
|---|---|---|---|---|---|---|
| 1 | 4.93 | 0.88 | 81.11 | 32.50 | 102.67 | |
| 2 | 11.01 | 0.88 | 162.23 | 31.17 | 72.60 | |
| 3 | 17.10 | 0.88 | 243.34 | 30.42 | 59.28 | |
| 4 | 23.19 | 0.88 | 324.45 | 29.90 | 51.34 | 1 |
| 5 | 29.28 | 0.88 | 405.57 | 29.51 | 45.92 | |

TABLE 1-continued

Molecular Dimensions of Oligomers (n-mers) and Diffusivity Calculation

| Degree of Polymerization n-mer | Molecular Length A° | Molecular Height A° | Molar Vol $\frac{cm^3}{mol}$ | Binary Diff $Dab * 10^5$ $\left(\frac{m^2}{s}\right)$ | Knudsen Diffusivity $\frac{DaK}{Pore\ Size}$ | Remarks |
|---|---|---|---|---|---|---|
| 6 | 35.37 | 0.88 | 486.68 | 29.18 | 41.92 | |
| 7 | 41.46 | 0.88 | 567.80 | 28.92 | 38.81 | |
| 8 | 47.55 | 0.88 | 648.91 | 28.69 | 36.30 | |
| 9 | 53.64 | 0.88 | 730.02 | 28.48 | 34.22 | 2 |
| 10 | 59.73 | 0.88 | 811.14 | 28.30 | 32.47 | |
| 11 | 65.82 | 0.88 | 892.25 | 28.14 | 30.96 | |
| 12 | 71.91 | 0.88 | 973.36 | 28.00 | 29.64 | |
| 13 | 78.00 | 0.88 | 1054.48 | 27.86 | 28.48 | 3 |
| 14 | 84.09 | 0.88 | 1135.59 | 27.74 | 27.44 | |
| 15 | 90.18 | 0.88 | 1216.70 | 27.62 | 26.51 | |
| 16 | 96.27 | 0.88 | 1297.82 | 27.52 | 25.67 | |
| 17 | 102.36 | 0.88 | 1378.93 | 27.42 | 24.90 | 4 |
| 18 | 108.45 | 0.88 | 1460.04 | 27.32 | 24.20 | |
| 19 | 114.54 | 0.88 | 1541.16 | 27.23 | 23.55 | |
| 20 | 120.63 | 0.88 | 1622.27 | 27.15 | 22.96 | |
| 21 | 126.72 | 0.88 | 1703.39 | 27.07 | 22.41 | |
| 22 | 132.81 | 0.88 | 1784.50 | 27.00 | 21.89 | |
| 23 | 138.90 | 0.88 | 1865.61 | 26.92 | 21.41 | |
| 24 | 144.99 | 0.88 | 1946.73 | 26.86 | 20.96 | |
| 25 | 151.08 | 0.88 | 2027.84 | 26.79 | 20.53 | |
| 26 | 157.17 | 0.88 | 2108.95 | 26.73 | 20.14 | |
| 27 | 163.25 | 0.88 | 2190.07 | 26.67 | 19.76 | |
| 28 | 169.34 | 0.88 | 2271.18 | 26.61 | 19.40 | |
| 29 | 175.43 | 0.88 | 2352.29 | 26.55 | 19.07 | |
| 30 | 181.52 | 0.88 | 2433.41 | 26.50 | 18.75 | |
| 31 | 187.61 | 0.88 | 2514.52 | 26.45 | 18.44 | |
| 32 | 193.70 | 0.88 | 2595.64 | 26.40 | 18.15 | |
| 33 | 199.79 | 0.88 | 2676.75 | 26.35 | 17.87 | |
| 34 | 205.88 | 0.88 | 2757.86 | 26.30 | 17.61 | |
| 35 | 211.97 | 0.88 | 2838.98 | 26.25 | 17.35 | |
| 36 | 218.06 | 0.88 | 2920.09 | 26.21 | 17.11 | |
| 37 | 224.15 | 0.88 | 3001.20 | 26.17 | 16.88 | |
| 38 | 230.24 | 0.88 | 3082.32 | 26.13 | 16.66 | |
| 39 | 236.33 | 0.88 | 3163.43 | 26.08 | 16.44 | |
| 40 | 242.42 | 0.88 | 3244.54 | 26.04 | 16.23 | |
| 41 | 248.51 | 0.88 | 3325.66 | 26.01 | 16.03 | |
| 42 | 254.60 | 0.88 | 3406.77 | 25.97 | 15.84 | |
| 43 | 260.69 | 0.88 | 3487.89 | 25.93 | 15.66 | |
| 44 | 266.78 | 0.88 | 3569.00 | 25.90 | 15.48 | |
| 45 | 272.87 | 0.88 | 3650.11 | 25.86 | 15.31 | |
| 46 | 278.96 | 0.88 | 3731.23 | 25.83 | 15.14 | |
| 47 | 285.05 | 0.88 | 3812.34 | 25.79 | 14.98 | |
| 48 | 291.14 | 0.88 | 3893.45 | 25.76 | 14.82 | |
| 49 | 297.23 | 0.88 | 3974.57 | 25.73 | 14.67 | |
| 50 | 303.32 | 0.88 | 4055.68 | 25.70 | 14.52 | |

Note:
1, 20A° pores would not be large enough for uninhibited mobility for this size oligomer (4-mer).
2, 50A° pores would not be large enough for uninhibited mobility for this size oligomer (9-mer).
3, 75A° pores would not be large enough for uninhibited mobility for this size oligomer (13-mer).
4, 100A° pores would not be large enough for uninhibited mobility for this size oligomer (17-mer).

This situation of hindered pore diffusional rates for grown oligomers ("n" being large) would become seriously worsened when the molecular linear dimension becomes larger than the pore mouth opening, as illustrated in the Remarks column of Table 1.

The lower left shaded area of Table 2 represents the theoretically computed Knudsen diffusivity in a very restrictive situation where the molecular linear dimension (i.e., computed molecular length) is larger than the pore opening dimension. In such situations, the actual diffusivity of the oligomer would be even lower than the computed value, i.e., oligomers whose molecular sizes exceed the critical dimensions would be nearly immobile (and stagnant) inside or through the pore channels and/or be prohibited from growing any further within the confined space of such small pores.

This is the reason why over-abundance of very small pores is detrimental for PTMEA polymerization over halloysite catalyst.

Example 2

General Description of Supercritical $CO_2$ Treatment Procedure (FIG. 6)

(1) A reactor thimble which was specially made of stainless steel 316 to hold the halloysite sample. The distributor plate (a finely perforated plate) was installed and used to hold the sample on it. This plate allows the $CO_2$ to diffuse directly through the halloysite sample bed. This "flow-through" condition is deemed important for a good treatment, since it ensures excellent mass transfer of $CO_2$ to the halloysite particles and their pores. It also facilitates an easy and full recovery of the SC-treated sample after the treatment experiment.

(2) Autoclave-based reactor body (SS316) with a heating jacket, of a 1-liter volume. The thimble is placed inside of this pressure vessel.

(3) The reactor top which is bolted onto the reactor body. Proper torqueing is very important to completely seal the reactor. This is why it is called a top-loading bolt-closure reactor.

(4) Valve for $CO_2$ supply and shut-off.

(5) Compressed $CO_2$ cylinder (a T-sized cylinder), which serves as a $CO_2$ source for the experiment.

(6) Reactor Relief Vent valve for relieving the pressure and evacuating the $CO_2$ from the reactor. This valve is opened at the conclusion of treatment experiment.

Raw halloysite was dried in a vacuum oven at 60° C. for 6 hours and stored in a desiccator before the supercritical treatment. The heart of the supercritical fluid treatment system was a 1000 cc stainless steel 316 Autoclave (2) whose design pressure rating is 5000 psia (or 34.47 MPa) at 540° C. with a design safety factor of 4.0 applied. Pressure vessel (2) is a top-loading and bolt-closure type. A specially made sample holding cylinder (1) fitted with porous distributor plate that allows the supercritical fluid to freely pass through, was used to keep a batch size of 250 grams of the dried raw halloysite. After the sample was loaded, reactor top (3) was placed (or mounted) with a metallic O-ring inserted between the reactor top and the body and the bolts on the reactor top were evenly torqued to the specification of 70 $lb_f$·ft (or, 94.9 N·m). The reactor system was flushed with a flow of $CO_2$ at 30 psia (0.206 MPa) in order to ensure that the system did not have any remaining air or moisture. The system was then sealed and ready for $CO_2$ input and pressurization. In order to maintain the $CO_2$ solvent density throughout the treatment process, the solvent density of $scCO_2$ at the desired temperature and pressure has to be accurately estimated using the Peng-Robinson equation of state. The reactor (with loaded halloysite) was pressurized with $CO_2$ to the pre-calculated pressure at the current temperature condition. A jacketed reactor was then turned on and raised to a pre-determined set point. Two hours was allowed for the reactor to heat up to the set point. Once the desired temperature was reached, supercritical fluid treatment of the halloysite began. Once the pre-determined treatment time elapsed at the desired supercritical treatment conditions, the process was terminated by turning off all power and closing the $CO_2$ supply valve 40B on the tank. The supercritical reactor was cooled overnight. The supercritically treated sample was taken out and stored in a desiccator.

Supercritical $CO_2$ System Procedure

Seal the Reactor 1.1 Fill sample thimble cylinder (1) that goes in reactor (2) with sample.

1.2 Cover the O-ring with Krytox gel.

1.3 Put the O-ring on reactor base with the rounded side down.

1.4 Put the reactor top (3) on.

1.5 Finger tighten the bolts.

1.6 Using the numbers on the reactor, tighten the bolts with the torque wrench:

1.6.1 1-L autoclave 60 ft·lbs→65 ft·lbs→70 ft·lbs twice 1.6.2 300 ml autoclave 30 ft·lbs→35 ft·lbs→40 ft·lbs twice.

1.7 Tighten the $CO_2$ inlet and outlet nuts.

1.8 Insert the temperature probe.

Initialize the Reactor 2.1 Open the $CO_2$ supply valve (4) on the $CO_2$ tank (5).

2.2 Close vent (6) and feed valves if open.

2.3 Turn on the power strips in the box, and turn on the air 2.4 Turn on the temperature, reactor, and fan switches, not shown.

Note: Use the fan on the reactor for the duration of the reaction.

2.5 Set the reactor temperature to ~110° F. using the Reactor Heater Control on the box by changing the set point (SP) to 110.

2.6 Pressurize the reactor to 600 psi and vent (6) 3 times to remove humidity.

Running the Reactor 3.1 Find the density of $scCO_2$ at the desired temperature and pressure.

3.2 Use Peng-Robinson equation of state to calculate the starting pressure corresponding to the current reading temperature (keep the density identical).

3.3 Pressurize reactor (2) to the calculated pressure.

3.4 Change the set point to the desired temperature.

3.5 Allow ~2 hrs for the reactor to heat up to the desired temperature.

3.6 Periodically (approximately every 10 minutes) check the temperature and pressure and compare the reading pressure to the Peng-Robinson calculated value; pressurize or vent accordingly.

3.7 Once the desired temperature is reached, the reaction time starts.

Stopping the Reactor 4.1 Once the reaction time is up, turn off the temperature and reactor switches.

4.2 Turn off the power strips and air.

4.3 Close the $CO_2$ supply valve (4) on the $CO_2$ tank (5)

4.4 Let the reactor cool overnight.

4.5 Unseal the reactor (2) and appropriately store the sample.

4.6 Clean the reactor base, top, and O-ring using acetone.

Example 3

Optimization of Supercritical Treatment Conditions

A fluid that exists at a temperature higher than its critical temperature and at a pressure higher than its critical pressure is called a supercritical fluid. A supercritical fluid exhibits extraordinary physico-chemical properties that are unattainable and drastically different from its liquid or vapor phase counterparts. Such properties include density, dielectric constant, viscocity, polarity, diffusivity, solubility, and more. The critical temperature and pressure of carbon dioxide ($CO_2$) is 31.4° C. and 72.9 atm (or, 1072 psi), respectively. Therefore, carbon dioxide which exists at T>31.4° C. and P>1072 psi is supercritical carbon dioxide. To validate and compare the efficacy of the supercritical $CO_2$ treatment on halloysite, various supercritical conditions of $CO_2$ were applied. Catalysts were made using the procedures described in Example 10 and polymerization runs were also carried out the standardized procedure (Example 5).

TABLE 3

Comparison of Differently Prepared Korean Halloysite Catalysts in Identical PTMEA Reaction Conditions for their Efficacy and Reactivity

| | | Catalyst Preparation Method | | | Polymerization Reaction Conditions | | | | | | Product. Yield | |
|---|---|---|---|---|---|---|---|---|---|---|---|---|
| Run# | Cat ID | Supercrit. Subcritic. $CO_2$ | $CO_2$ Trtmt T, °C. | $CO_2$ Trtmet P, psi | Acid Wash Method followed | Cat Amt, g | Rxtnt Amt, g | $Ac_2O$ % of Rxtnt | Cat % of Rxtnt | Rxn Time, h | Rxn T, °C. | Oligomer Yield % | Avg. |
| 1 | SC11 | SC | 260 | 1500 | 4 | 30 | 100 | 7 | 30.0 | 8 | 50 | 51.69 | 50.55 |
| 2 | SC11 | SC | 260 | 1500 | 4 | 30 | 100 | 7 | 30.0 | 8 | 50 | 49.42 | |
| 3 | G10 | SC | 260 | 2500 | 4 | 30 | 100 | 7 | 30.0 | 8 | 50 | 50.11 | 50.11 |
| 4 | G11 | SC | 75 | 1500 | 4 | 30 | 100 | 7 | 30.0 | 8 | 50 | 23.45 | 23.45 |
| 5 | G12 | SC | 260 | 1200 | 4 | 30 | 100 | 7 | 30.0 | 8 | 50 | 32.82 | 32.82 |
| 6 | G22 | Sub | 75 | 250 | 4 | 30 | 100 | 7 | 30.0 | 8 | 50 | 17.78 | 17.78 |
| 7 | UT4 | No $CO_2$ trtmt | No $CO_2$ trtmt | No $CO_2$ trtmt | 4 | 30 | 100 | 7 | 30.0 | 8 | 50 | 19.72 | 19.72 |

Note:
SC = supercritical condition of $CO_2$;
Sub = subcritical condition of $CO_2$;
No CO2 trtmt = not treated under $CO_2$ Catalyst ID#

G-series numbers for catalysts were created in order to make comparison with our standardized conditions, i.e., SC 11 (or Cat. 11) for the SC-treated catalyst that received SC treatment at its optimal treatment conditions of 260° C. and 1500 psi [we may regard this as Supercritically treated catalyst "Control"] and UT #4 (or UT4, Cat. 4) for the catalyst which did not receive supercritical $CO_2$ treatment [we may regard this as Non-supercritical catalyst]. In fact, UT4 (or Cat 4) did not receive any $CO_2$ pretreatment.

G10. Supercritical fluid treatment at 260° C. and 2500 psi (much higher than Control's 1500 psi) for 3 hours followed by ion exchange Method #4 (1N HCl and 1N $NH_4Cl$) with ion exchange with fresh solution as the first stage and then two additional consecutive stages of ion exchange with filtrate solution. Each exchange stage is for duration of 15 minutes. DI water rinsing was applied after each soaking stage.

G11. Supercritical fluid treatment at 75° C. (substantially lower than Control's 260° C., but still higher than the critical temperature of 31.4° C.) and 1500 psi for 3 hours followed by ion exchange Method #4 (1N HCl and 1N $NH_4Cl$) with ion exchange with fresh solution as the first stage and then two additional consecutive stages of ion exchange with filtrate solution. Each exchange stage is for duration of 15 minutes. DI water rinsing was applied after each soaking stage.

G12. Supercritical fluid treatment at 260° C. and 1200 psi (barely higher than $P_c$=1072 psi) for 3 hours followed by ion exchange Method #4 (1N HCl and 1N $NH_4Cl$) with ion exchange with fresh solution as the first stage and then two additional consecutive stages of ion exchange with filtrate solution. Each exchange stage is for duration of 15 minutes. DI water rinsing was applied after each soaking stage.

G22. $CO_2$ treatment, but at subcritical condition of 75° C. and 250 psi (P<1072 psi; therefore, subcritical $CO_2$) for 3 hours followed by ion exchange Method #4 (1N HCl and 1N $NH_4Cl$) with ion exchange with fresh solution as the first stage and then two additional consecutive stages of ion exchange with filtrate solution. Each exchange stage is for duration of 15 minutes. DI water rinsing was applied after each soaking stage.

It was also found that a higher supercritical pressure condition of P=2500 psi does not improve the resultant catalytic activity, or is about equal at best, compared to the 1500 psi case, yet increasing the treatment cost. However, treatment of halloysite at a lower pressure (of 250 psi) than the critical pressure of $CO_2$, i.e., P<1072 psi, has not shown a positive effect on the catalytic activity enhancement. This proves that the morphological changes induced by the supercritical $CO_2$ treatment could not be obtained by a subcritical $CO_2$ treatment. It also proves that supercritical-$CO_2$ treatment at T=260° C. and P=1500 psi is at or near the optimal treatment condition. It is believed that the pseudo-walls created by organometallic aggregates or geological humus (likely embedded during multiple volcanic activities and biological activities) inside the raw halloysite pore structures can be broken down and/or cleansed only by supercritical carbon dioxide based on its extraordinary solvating power toward organic substances, efficient cleansing action of crystallites, and exfoliation capability of crystalline layers.

Example 4

Ion Exchange Acid Wash Procedures

In order to find and optimize the effects of the filtering solution strengths, the sequential stages, and the recycle of filtrate solution, a number of different ion exchange acid wash schemes were used. The catalysts prepared using different pretreatment/treatment or acid wash methods are designated with different Arabic numerals in the catalyst ID #. Non-modified halloysite catalyst wash treatments are set forth in ID numbers 1 through 8 whereas supercritical halloysite catalysts wash treatments are set forth in ID numbers 9 through 12.

Catalyst ID #

1. Single-stage soaking in 0.5N HCl aqueous solution followed by an additional stage of soaking in 0.5 N $NH_4Cl$ aqueous solution. DI water rinsing was applied after each soaking stage.

2. Three stages of soaking in fresh 0.5N HCl aqueous solution followed by 3 additional stages of soaking in fresh 0.5N $NH_4Cl$ aqueous solution (for 15 min per each soaking stage). DI water rinsing was applied after each soaking stage.

3. Three stages of soaking in fresh 1N HCl aqueous solution followed by 3 additional stages of soaking in fresh 1 N NH$_4$Cl aqueous solution (for 15 min each soaking stage). DI water rinsing was applied after each soaking stage.

4. Three stages of soaking in 1N HCl aqueous solution followed by 3 additional stages of soaking in 1N NH$_4$Cl aqueous solution with using fresh solution (for both HCl and NH$_4$Cl) for the first stage and filtrate solution (for both HCl and NH$_4$Cl) for the second and third stages. Each soaking stage was for duration of 15 minutes. DI water rinsing was applied after each soaking stage.

5. Three stages of soaking in 1N HCl aqueous solution followed by 3 additional stages of soaking in 1N NH$_4$Cl aqueous solution with using fresh solution (for both HCl and NH$_4$Cl) for the first stage and filtrate solution (for both HCl and NH$_4$Cl) for the second and third stages. Each soaking stage was for duration of 30 minutes. DI water rinsing was applied after each soaking stage.

6. Three stages of soaking in 1M H$_3$PO4 aqueous solution followed by 3 stages of soaking in 1 M (NH$_4$)$_2$HPO$_4$ aqueous solution with using fresh solution (for both H$_3$PO$_4$ and (NH$_4$)$_2$HPO$_4$) for the first stage and filtrate (for both H$_3$PO$_4$ and (NH$_4$)$_2$HPO$_4$) for the second and third stages. Each soaking stage was for duration of 15 minutes. DI water rinsing was applied after each soaking stage.

7. Three stages of soaking in Fresh 1 M H$_3$PO$_4$ aqueous solution followed by 3 additional stages of soaking in fresh 1 M (NH$_4$)$_2$HPO$_4$ aqueous solution (duration of 15 min for each soaking stage). DI water rinsing was applied after each soaking stage.

8. Three stages soaking in 0.5 N HCl aqueous solution followed by 3 additional stages of soaking in 0.5 N NH$_4$Cl aqueous solution with using fresh solution (for both HCl and NH$_4$Cl) for the first stage and filtrate solution (for both HCl and NH$_4$Cl) for the second and third stages (duration of 15 min for each soaking stage). DI water rinsing was applied after each soaking stage.

9. Supercritical fluid treatment at 230° C. and 1500 psi for 3 hours followed by ion exchange Method #4 (1N HCl and 1N NH$_4$Cl) with ion exchange with fresh solution as the first stage and then two additional consecutive stages of ion exchange with filtrate solution. Each exchange stage is for duration of 15 minutes. DI water rinsing was applied after each soaking stage.

10. Supercritical fluid treatment at 200° C. and 1500 psi for 3 hours followed by ion exchange Method #4 (1N HCl and 1 N NH$_4$Cl) with ion exchange with fresh solution as the first stage and then two additional consecutive stages of ion exchange with filtrate solution. Each exchange stage is for duration of 15 minutes. DI water rinsing was applied after each soaking stage.

11. Supercritical fluid treatment at 260° C. and 1500 psi for 3 hours followed by ion exchange Method #4 (1N HCl and 1 N NH$_4$Cl) with ion exchange with fresh solution as the first stage and then two additional consecutive stages of ion exchange with filtrate solution. Each exchange stage is for duration of 15 minutes. DI water rinsing was applied after each soaking stage.

12. This applies only to fine-powdery New Zealand halloysite. Supercritical fluid treatment at 260° C. and 1500 psi for 5 hours followed by a single stage of soaking in 1N HCl aqueous solution followed by 3 stages of DI water rinsing, then a single stage of soaking in 1N NH$_4$Cl aqueous solution followed with 3 stages of DI water rinsing. Each soaking stage was for a duration of 90 minutes.

Method #4 was found to be effective, while the differences among various methods were not very significant.

Methods 9 through 12 are for supercritically modified halloysites. They are essentially the same as Method #4, except that these samples were supercritically treated before the ion exchange.

Acid Wash Treatment for Ion Exchange for Halloysite

The standardized acid treatment procedure involves HCl treatment followed by NH$_4$Cl treatment. The amount of soaking acid and the soaking duration depend upon specific halloysites used, more specifically on their pore morphology and particle size distribution. It takes about 2.5 to 9 hours for the entire acid treatment procedure to be completed and it strongly depends on the types of halloysites and whether the halloysites are SC treated or not. In general, it takes the shortest time (~2.5 hours) with the scCO$_2$ treated Korean halloysite, whereas the untreated New Zealand halloysite requires the longest time (~9 hours). Approximate times required for complete acid wash sequences are as follows:

Korean Halloysite (supercritically treated): ~2.5 hours
Korean Halloysite (untreated): ~5 hours
New Zealand halloysite (supercritically treated): ~5 hours
New Zealand halloysite (untreated): ~9 hours The standardized procedure for acid wash ion exchange steps are explained below.

1. HCl Wash
  1.1 Soak with 500 ml 1 M Fresh HCl aq. solution for 15 minutes
  1.2 Filtrate under vacuum (−600 mmHg i.e., 160 mmHg absolute), collect filtrate
  1.3 Rinse with 1000 ml DI water
  1.4 Soak with step 1.2 filtrate for 15 minutes
  1.5 Filtrate under vacuum (−600 mmHg vacuum), collect filtrate
  1.6 Rinse with 1000 ml
  1.7 Soak with step 1.5 filtrate for 15 minutes
  1.8 Filtrate under vacuum (−600 mmHg vacuum)
  1.9 Rinse with DI water until pH reaches 6
2. NH$_4$Cl Wash
  2.1 Soak with 500 ml 1M NH$_4$Cl aq. solution for 15 minutes
  2.2 Filtrate under vacuum (−600 mmHg vacuum), collect filtrate
  2.3 Rinse with 1000 ml DI water
  2.4 Soak with step 2.2 filtrate for 15 minutes
  2.5 Filtrate under vacuum (−600 mmHg vacuum), collect filtrate
  2.6 Rinse with 1000 ml
  2.7 Soak with step 2.5 filtrate for 15 minutes
  2.8 Filtrate under vacuum (−600 mmHg vacuum)
  2.9 Rinse with DI water until pH reaches 6

Example 5

Polymerization Reaction Procedure

The polymerization reaction was carried out in a stirred batch glass reactor system, see FIG. 1. A three-necked (or four-necked) round-bottom flask (105) of 500 cc volume, and having stoppers (103), (104), and (107), was used as a reactor. The flask reactor was precisely fitted in the heating jacket (106) that was equipped with a heater control mechanism (108). A predetermined amount of the halloysite catalyst pellets was weighed and loaded in the reactor. Then, a pre-determined amount of THF monomer and acetic anhydride (Ac$_2$O) were charged into the reactor. The reactor heater (106) was turned on with a heating rate of 5° C./min. Once the reactor and its contents reached the desired reaction temperature, the electric stirrer (101) having shaft (102) was turned on and the stirrer speed was set at 200 rpm. At that moment, the polymerization reaction began. After a predetermined reaction time, the reaction was stopped by turning all power off to heater (105) and stirrer. The reaction product mixture that includes product oligomers and polymers as well as unreacted monomers were recovered from the reactor vessel. The product mixture was separated into PTMEA oligomers/polymers and unreacted THF via vacuum distillation.

Example 6

Polymerization Product Separation

The desired product from the catalytic polymerization reaction was oligomeric PTMEA (liquid phase). Since the PTMEA oligomers were fully miscible with THF, the product had to be separated and isolated from the reactor content mixture which consisted of unreacted THF, unreacted acetic anhydride, and oligomeric PTMEA. The product separation was accomplished using a distillation procedure based on the boiling point difference of each molecular species.

The distillation apparatus is shown in FIG. 10.
Heating Plate (Model: IKA RCT Basic) (3)
Recirculating cooler (Model: Julabo FP 50) (4)
Vacuum pump (Model: Robinair VacuMaster 15115) (5)
250 mL 2-neck round bottom flask (6)
250 mL Erlenmeyer flask (7)
Allihn-type condenser, TS 24/40 (8)
105° bend vacuum take-off glass adaptor, TS 24/40 (9)
The procedure for product separation is as follows:

1 Weigh an empty 250-mL Erlenmeyer flask (7) and a 250-mL 2-neck round bottom flask (6).

2 Add ~50-80 g of liquid product mixture into the 2-neck round bottom flask (6). Weigh it after loading the sample.

3 Turn the recirculating water cooler (4) on and set the temperature to 10° C. Circulate the cooling water through an Allihn-type condenser (8).

4 Turn on the heating plate (3) and raise the product mixture sample temperature at atmospheric pressure until 130° C. is reached. The heating rate used is 10° C./min.

5 Allow the sample to evaporate for 5 minutes at a fixed temperature of 130° C. and under 25 in. Hg of vacuum (i.e., 4.92 in·Hg absolute). Use the vacuum pump (5).

6 Turn off the equipment and allow the sample to cool until room temperature is reached.

7 Weigh both flasks on an analytical balance.

The product yield can be calculated using the following formulae:

$$\text{Yield (wt \%)} = \left( \frac{\text{weight of } RB \text{ flask after evaporation} - \text{weight of empty } RB \text{ flask}}{\text{weight of } RB \text{ flask with sample} - \text{weight of empty } RB \text{ flask}} \right) * 100$$

$$\text{Volatile content (wt \%)} = \left( \frac{\text{weight of } RB \text{ flask with sample} - \text{weight of } RB \text{ flask after evaporation}}{\text{weight of } RB \text{ flask with sample} - \text{weight of empty } RB \text{ flask}} \right) * 100$$

Example 7

Method for GPC Analysis for the PTMEA Molecular Weight Distribution

The GPC analysis samples used were 2 mL sample vials from Thermo Scientific. Approximately 5 µL of the liquid product from the polymerization reaction was added to each of the vials, and were then filled with 1.5 mL of HPLC grade Tetrahydrofuran (THF) and capped. Before use, these vials were stored capped in room condition next to the GPC unit itself. All GPC runs were started within 48 hours of filling the vials, in order to minimize any effect of time. Two hours before the start of the GPC runs, the vials were placed in the temperature controlled autosampler reservoir inside the GPC unit itself.

The GPC unit that was used for this process is a Thermo Fisher Scientific UHPLC Ultimate 3000 containing a charged array detector. HPLC solvents used during the process were 2-Propanol as a cleaning solvent and THF as the active solvent for the separation. These two solvents were ordered via Fisher Chemical with the following specifications. The 2-Propanol was the Optima LC/MS A461-4 Lot 157344 and the THF was the HPLC Grade T425-4 Lot 163751. Notably, the THF contained no preservatives to prevent the formation of peroxides in the THF. The system contained a preliminary guard column and two Agilent PL-gel 5 µm diameter GPC columns.

In order to compare the samples to a known polymer, a set of standards were tested in quadruplicate. These standards were a polyethylene glycol (PEG) standardized polymer with molecular weights summarized in the following table. PEG was chosen as a standard because it is a common polymer that is soluble in THF, rather than a polymer like polystyrene which is insoluble in THF. Due to the nature of the charged array detector, small polymers were undetectable, but since all of the runs eluted within the detectable range of the PEG, it is assumed that none of the range of the unknown polymer is also missed.

TABLE 4

Elution order and times for the PEG standard. This yields a curve that correlates elution time on the GPC and the approximate molecular weight of the sample.

| Elution Order | Molecular Weight PEG (g/mol) | Approximate Elution Time (min) |
| --- | --- | --- |
| 1 | 942000 | 10.66 |
| 2 | 552000 | 11.03 |
| 3 | 122200 | 12.49 |
| 4 | 67600 | 13.05 |
| 5 | 31630 | 13.74 |
| 6 | 16100 | 14.45 |
| 7 | 3870 | 15.72 |
| 8 | 1450 | 16.74 |
| 9 | 615 | 17.75 |

Each run of the sample or the standard was done at 1 mL/min of HPLC grade THF with approximately 1000 psi of pressure on the column system. Each run was 25 minutes in length to maintain isolation between samples and each sample was run in triplicate. Once complete, the peaks from each sample were integrated using the Chromeleon 7 software and the molecular weight was estimated using the calibration standards shown above. A report was generated for each sample and averaged for each run of the same sample, yielding average molecular weight and polydispersity as well as the standard deviation between the runs of the same sample.

In accordance with the above procedures, various polymeric reactions were made with regard to supercritical prepared Korean halloysites, non-supercritical Korean halloysites, supercritical prepared New Zealand halloysites, and non-supercritical prepared New Zealand halloysites with regard to determining the molecular polydispersity thereof, i.e. the weight average molecular weight divided by the number average molecular weight. The same is set forth in Table 5.

TABLE 5

| | | Polymerization Reaction Conditions | | | | | | Product Molecular Weight Data | | |
|---|---|---|---|---|---|---|---|---|---|---|
| Cat. Type Sc or Not | Cat. loading (g) | total reactant mass (g) | % Ac2O | Cat. Content (wt %) | time (h) | Temp (C.) | Reactor | Stirer (rpm) | Mn | Mw | Poly-dispersity |
| Korean-Un | 30 | 100 | 7 | 30 | 2 | 50 | IKA | 200 | 1496 | 4949 | 3.34 |
| Korean-Un | 30 | 100 | 7 | 30 | 4 | 50 | IKA | 200 | 1080 | 3607 | 3.35 |
| Korean-Un | 30 | 100 | 7 | 30 | 8 | 50 | IKA | 200 | 1110 | 3779 | 3.45 |
| Korean-SC | 30 | 100 | 7 | 30 | 2 | 50 | IKA | 215 | 1654 | 5947 | 3.68 |
| Korean-SC | 30 | 100 | 7 | 30 | 4 | 50 | IKA | 215 | 1300 | 5158 | 4.06 |
| Korean-SC | 30 | 100 | 7 | 30 | 8 | 50 | IKA | 215 | 1242 | 4827 | 4.08 |
| NZ-Un | 30 | 100 | 7 | 30 | 2 | 50 | IKA | 214 | 1247 | 4680 | 3.78 |
| NZ-Un | 30 | 100 | 7 | 30 | 4 | 50 | IKA | 214 | 1068 | 3904 | 3.66 |
| NZ-Un | 30 | 100 | 7 | 30 | 8 | 50 | IKA | 214 | 840 | 3107 | 3.67 |
| NZ-SC | 30 | 100 | 7 | 30 | 2 | 50 | IKA | 200 | 1207 | 4001 | 3.32 |
| NZ-SC | 30 | 100 | 7 | 30 | 4 | 50 | IKA | 200 | 1218 | 3734 | 3.08 |
| NZ-SC | 30 | 100 | 7 | 30 | 8 | 50 | IKA | 200 | 1180 | 3506 | 2.98 |

As apparent from Table 5, the polydispersity of the oligomer products using supercritically prepared catalysts ranges between about 3 and 4, more specifically 3.0-3.3 for the polymer products using the supercritical New Zealand catalyst and 3.7-4.0 for the polymer products made using supercritical Korean catalysts. As apparent from Table 5, the supercritically treated catalysts produce higher molecular weight polymer products than the untreated catalysts for the same reaction time durations under the same reaction conditions. This finding is very consistent for both Korean and New Zealand halloysites, thus verifying the higher polymerization activity for the supercritically treated halloysite catalysts in comparison to the untreated counterparts.

Figure 13A:
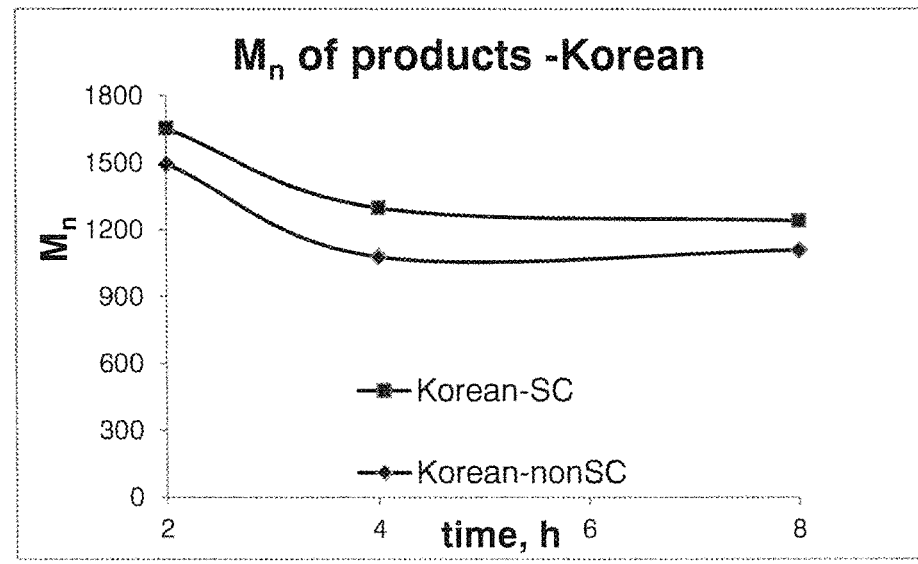
FIG. 13A shows comparison of the number average molecular weights with regard to Korean supercritical prepared and unprepared halloysite catalysts.
Figure 13B:
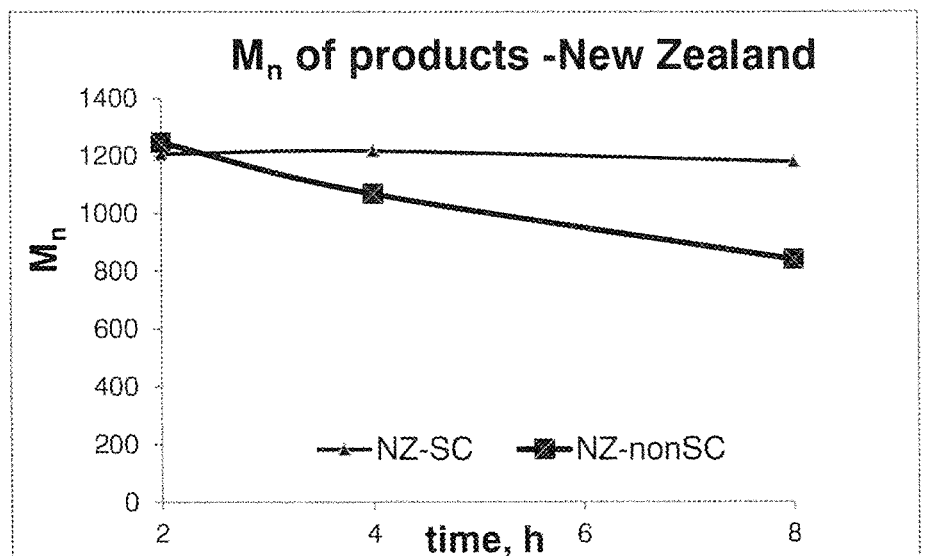
FIG. 13B shows comparison of the number average molecular weights with regard to the New Zealand supercritical prepared and unprepared halloysite catalysts.
Figure 14A:
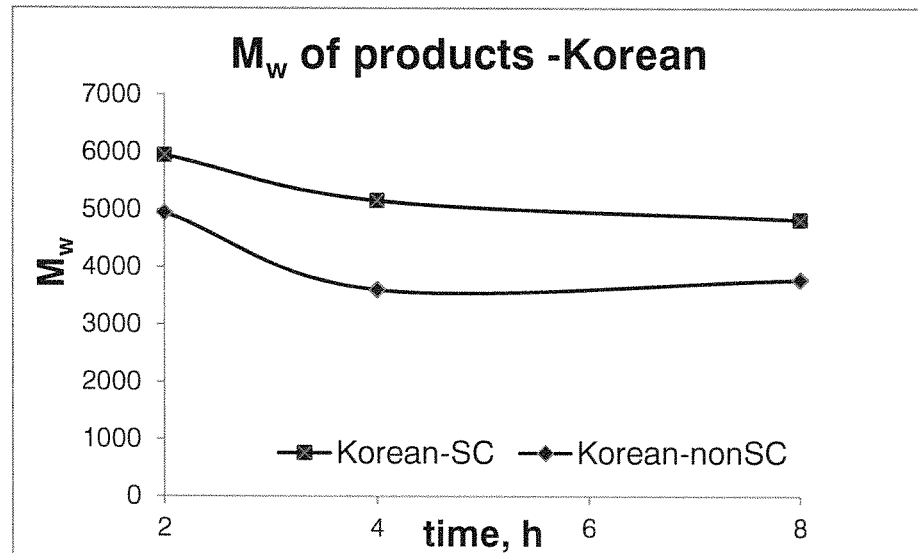
FIG. 14A shows comparison of the weight average molecular weight with regard to Korean supercritical prepared and unprepared halloysite catalysts.
Figure 14B:
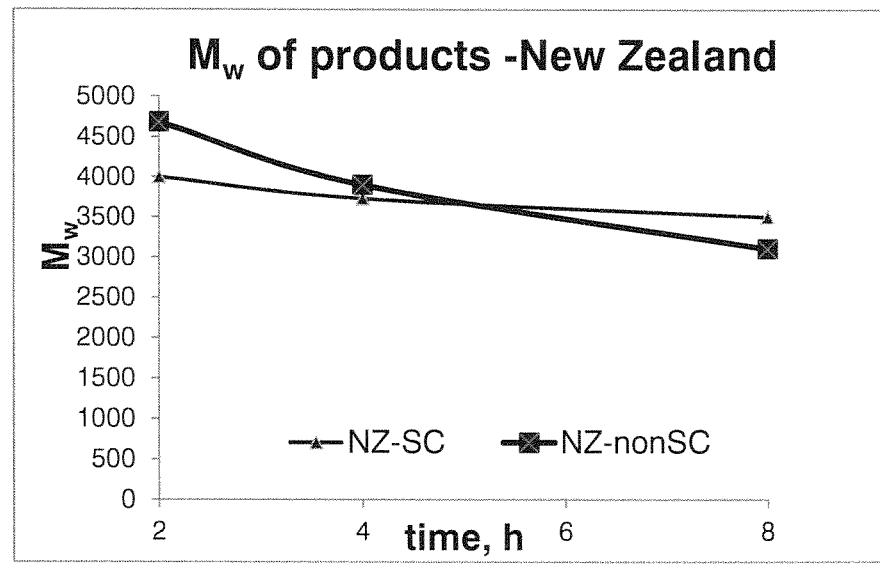
FIG. 14B shows comparison of the weight average molecular weight with regard to New Zealand supercritical prepared and unprepared halloysite catalysts.

As apparent from FIG. 13A, number average weight of the Korean and New Zealand halloysites are plotted showing that the supercritical produced halloysites of the present invention had higher molecular weight averages for equal amount of reaction time length. FIGS. 14A and 14B relate to the weight average molecular weight of Korean and New Zealand halloysites wherein with respect to the Korean halloysites, the higher molecular weight average was always obtained.

Example 8—See FIG. 11

Production Yields: Supercritical vs. Untreated Korean Catalyst

| Cat. # | Treatment | Cat. Loading g | total reactant mass g | % Ac2O | Cat. Content (wt %) | time (h) | Temp (C.) | Mixer | speed | yield |
|---|---|---|---|---|---|---|---|---|---|---|
| | | | | Control | | | | | | |
| K4 | Un- | 30 | 100 | 7 | 30 | 0 | 50 | IKA | 200 | 0.0 |
| K4 | Un- | 30 | 100 | 7 | 30 | 2 | 50 | IKA | 200 | 5.0 |
| K4 | Un- | 30 | 100 | 7 | 30 | 6 | 50 | IKA | 200 | 17.0 |
| K4 | Un- | 30 | 100 | 7 | 30 | 8 | 50 | IKA | 200 | 20.3 |
| K4 | Un- | 30 | 100 | 7 | 30 | 16 | 50 | IKA | 200 | 23.8 |
| | | | | Invention | | | | | | |
| K4B | Sc- | 30 | 100 | 7 | 30 | 0 | 50 | IKA | 215 | 0.0 |
| K4B | Sc- | 30 | 100 | 7 | 30 | 2 | 50 | IKA | 215 | 20.1 |
| K4B | Sc- | 30 | 100 | 7 | 30 | 4 | 50 | IKA | 215 | 36.1 |
| K4B | Sc- | 30 | 100 | 7 | 30 | 8 | 50 | IKA | 215 | 49.7 |
| K4B | Sc- | 30 | 100 | 1 | 30 | 16 | 50 | IKA | 215 | 54.0 |

Example 9—See FIG. 12

Production yields: supercritical-Treated vs. Untreated New Zealand Catalyst

| Cat. # | Treatment | Cat. loading (g) | total reactant mass (g) | % Ac2O | Cat. Content (wt %) | time (h) | Temp (C.) | Mixer | speed | yield |
|---|---|---|---|---|---|---|---|---|---|---|
| | | | | Invention | | | | | | |
| NZ4B | Sc- | 30 | 100 | 7 | 30 | 0 | 50 | IKA | 200 | 0.0 |
| NZ4B | Sc- | 30 | 100 | 7 | 30 | 2 | 50 | IKA | 200 | 32.9 |
| NZ4B | Sc- | 30 | 100 | 7 | 30 | 4 | 50 | IKA | 200 | 49.6 |
| NZ4B | Sc- | 30 | 100 | 7 | 30 | 8 | 50 | IKA | 200 | 52.2 |

-continued

| Cat. # | Treatment | Cat. loading (g) | total reactant mass (g) | % Ac2O | Cat. Content (wt %) | time (h) | Temp (C.) | Mixer | speed | yield |
|---|---|---|---|---|---|---|---|---|---|---|
| NZ4B | Sc- | 30 | 100 | 7 Control | 30 | 16 | 50 | IKA | 200 | 53.2 |
| NZ4 | Un- | 30 | 100 | 7 | 30 | 0 | 50 | IKA | 214 | 0.0 |
| NZ4 | Un- | 30 | 100 | 7 | 30 | 2 | 50 | IKA | 214 | 16.8 |
| NZ4 | Un- | 30 | 100 | 7 | 30 | 4 | 50 | IKA | 214 | 29.1 |
| NZ4 | Un- | 30 | 100 | 7 | 30 | 8 | 50 | IKA | 214 | 41.9 |
| NZ4 | Un- | 30 | 100 | 7 | 30 | 16 | 50 | IKA | 214 | 43.6 |

NZ4B catalysts are supercritically treated New Zealand halloysite catalyst prepared using the ion exchange method for Catalyst ID #4 (or essentially #11), whereas NZ4 catalysts are untreated New Zealand halloysite catalysts prepared using the ion exchange method for Catalyst ID #4.

All catalysts, both treated and untreated, received the same acid wash ion exchange treatments.

Example 10

Preparation of Halloysite Catalyst Extrudates (Pellets)

The catalyst pellets prepared for polymerization experiments were extruded as 4 mm$\phi$ cylinders (6.5 mm Long) using a catalyst extruder, Bonnot Catalyst Extruder (Desktop Model with a high-torque electric motor). The catalyst pellet diameter is controlled by using a dye with a specific bore opening dimension. The barrel length of this extruder is 13.8 cm with an overall barrel mixing zone diameter is 2.54 cm, i.e., an L/D ratio of 5.44. The ion exchanged (acid washed) halloysite paste is manually fed through a hopper that is installed immediately above the beginning section of the extruder barrel. The extrudates are cut with a razor blade for a uniform length of 6.5 mm. A merit of using an extruder is in its uniform distribution of mechanical stress inside the extruder barrel during the paste mixing and pellet shaping process. The "uniform stress distribution" renders better structural and mechanical integrity to the formed pellet, which ultimately results in an enhanced attrition resistance by eliminating the potential presence of mechanically weak segments or "soft spots" throughout the entire geometry of the catalyst pellet.

This method is adopted for preparation of all catalysts, both supercritically treated and untreated halloysites, for all polymerization experiments. The catalyst pellets with specific dimensions required for Dynamic Mechanical Analyzer (DMA) test for flexural strength measurement were prepared following the ASTM Standard No. C1161-13, approved Aug. 1, 2013, published September 2013. The analytical instrument used for this test is TA Instruments' Dynamic Mechanical Analyzer Model DMA Q800.

Example 11

Preparation of Mechanically Stronger Catalysts
A. Experiment

There is no teaching in the scientific and technological literature, nor known prior art for preparing mechanically strong catalyst pellets using naturally occurring powdery minerals such as halloysites. Therefore, some of the everyday life examples dealing with powdery materials, as in the cases with ceramic making, highly elastic noodles, pizza dough preparation, bread mix kneading, and concrete mix patching, are used in this study to create a simulative case and also to formulate (or postulate) the theoretical foundation for this effort. Interpretations and enhancement of the ideas are made using scientific teachings of surface energy, particle-particle interactions, molecular attraction/repulsion, thermal expansion/shrinkages, viscoelasticity, and more.

A.1 Potentially Significant Factors Affecting the Mechanical Strength and Hardness of Halloysite Catalyst Pellets that are Applicable to both Korean and New Zealand Halloysites 1. Existence of large transportational pores that is typically caused by random packing of large and small particles which create large inter-particle gap spaces. The abundance of such transportational pores creates weak and large void spots and causes breakage, collapse, or crack of catalyst pellet, i.e., resulting in weak and brittle catalyst pellets as well as powder formation, see FIG. 8.

2. Spatial gaps created during the calcination process. During calcination, increasing temperature causes evaporation, swelling, and crystal growth, while decreasing temperature induces shrinkage, condensation, crystal re-orientation, etc. These changes can also create or affect the spatial gap between particles, thus weakening the aggregated pellet. Therefore, the presence of micro- and macro-cavities needs to be minimized. Temperature ramping up and down also needs to be carefully programmed with allowance of structural re-orientation and microscopic migration of particles, which can usually be accomplished by holding the catalyst pre-pellets at constant intermediate temperatures for fixed amounts of time during calcination.

3. Even and uniform mechanical stress to be applied. Constant and uniform stress must be applied to the paste for an extended period of time in order to make a uniformly packed paste for extrusion and/or shape forming, see FIG. 8. With an aid of some appropriate analytical measurement(s) of these formed catalyst pellets, the significance of this factor can be verified.

4. Extruder barrel length. A longer extruder barrel is conjectured to achieve a better and more uniform mixing and re-orientation of the constituent particles, thus resulting in a compact pellet and essentially contributing to the elimination of large spatial gaps and transportational pores, see FIG. 8. The actual confirmation of this hypothesis can only be made using photos of scanning electron microscope (SEM).

A. Actual Experiments

A series of experiments were made in order to make a mechanically strong catalyst pellet on a consistent and reproducible basis using (a) Korean halloysite, (b) New Zealand halloysite, and (c) a mixture of both types.

B.1 Catalyst Preparation Procedures and Conditions—What is Altered or Unchanged?

In order to enhance and examine the mechanical strength of the catalyst pellet, certain parts of the catalyst preparation steps are revisited. In this specific task, supercritically pretreated samples were tested, since the supercritically pretreated samples do exhibit much easier acid wash, more favorable pore morphology, and higher catalytic activity. The pellet extrusion step was varied as described below, but still using the same Bonnot catalyst extrusion system. A summarized list of the preparation steps is provided below.

1. Supercritical $CO_2$ treatment—pretreated with supercritical carbon dioxide.
2. Acid wash ion exchange—same (standard method)
3. Paste mixing—same (standard method)
4. Pellet extrusion—varied. Three different types of extrusion procedures were adopted using a Bonnot Catalyst Extruder, (1) using a single barrel length extrusion (once-through passage of paste), (2) using a triple of the standard barrel length (3-times pass-through with manual re-feeding), and (3) a 6-times of the standard barrel length (6-times pass-through with manual re-feeding). These catalysts will be designated as a suffix of 1×, 3×, and 6×, respectively.
5. Calcination procedure—not changed (using standard procedure)

B.2 Comparative Tests Performed on Prepared Catalysts
B.2.a Mechanical Strength Measurement and Comparison The flexural strength of a 1.4-inch long specimen of cylindrical catalyst pellet (3 mm diameter) can be measured using 3 point bending fixture on TA Instrument's Dynamic Mechanical Analyzer (DMA). FIG. 3 shows the sample dimensions and equation for the measurement of the flexural stress of the catalyst. If this measurement is made on each type of catalyst pellet samples that have been made following the prescribed preparation steps, the breakdown strength of the catalyst pellet can be numerically determined and compared. This test is adapted from ASTM Standard No. C1161-13 and the work by Li, et al. adopted Aug. 1, 2013.

Data Analysis
C.1 General Statements Regarding the Catalyst Pellet Strength and Preparation Loss From our repeated experiments, the following general statements can be made:

1. Supercritically treated halloysites were substantially easier to accomplish the acid wash treatment due to their enhanced pore morphology (absence of nano- and super-small pores). This statement is applicable to both Korean and New Zealand halloysites.
2. Generally speaking, New Zealand halloysite was more difficult than Korean counterpart in making catalyst pellets due to its finer powdery and narrower monodisperse particle size distribution (PSD). However, better hand pre-kneading of pastes before extrusion alleviate some of such difficulty and eliminate any raw material loss during the preparation steps.
3. Finger pressure tests of such prepared catalysts were conducted by a multiple number of research team members, more as a survey, and all felt that all of the catalysts made, both Korean and New Zealand, were very strong. The catalysts were not brittle and they survived very well in the reactor conditions with a high agitation speed of 200 rpm for an extended period of time. No powdery residue has been detected in any of the reactor conditions.

C.2 Extrusion Length Dependent Effects

FIG. 7A shows a comparison of the flexural strengths of the Korean halloysite catalysts. As mentioned before, 1×, 3×, and 6× represent the catalyst extrudates (pellets) of once trough, 3-times through, and 6-times through, respectively. As shown in the figure, the flexural strength of 3× sample (5.1±0.4) was stronger than 1× sample (3.8±0.6) by 34%, while that of 6× sample (5.8±0.8) was stronger than 1× sample by 53%. The barrel length (1×) is 13.8 cm (5.44") long.

FIG. 7B shows a comparison of the flexural strength of the New Zealand halloysite catalysts. As shown in the figure, the flexural strengths of New Zealand catalysts samples were nearly the same for 1×, 3×, and 6× extrusion cases. The strength of the New Zealand halloysite catalyst is also considered very good in the 4.2-4.5 MPa range. Relative independence of or indifference to the extrusion length implies that sufficient kneading was already achieved in the hand premixing stage of paste preparation.

C.3 Scanning Electron Microscopy Investigation of the Prepared Catalysts

Scanning electron microscopy (SEM) is one of the analytical means that allows direct visualization of internal morphological structure of a catalyst pellet. This is particularly useful, when a pellet is created using a finely powdered raw material. SEM photographs of both Korean and New Zealand catalysts were taken on a number of 1×, 3×, 6× samples for each type of catalyst and the resultant photographs were directly compared for discerning characteristics.

C.3.a Korean Halloysite Catalysts

FIG. 9 shows the SEM photographs (with ×2000 magnification) of the Korean halloysite catalysts that have gone through 1× extrusion, 3× extrusion, and 6× extrusion, respectively.

As can be clearly seen, the 1× sample contains many large cavities and holes (voids) that can be classified as transportational pores of FIG. 8, which represent undesirable spatial interparticular gaps and ultimately cause weakness of the catalyst pellet. The photograph for 3× shows a substantial improvement in particle orientation inside the pellet and remarkable disappearance of transportational pores and large cavities. The photograph of the 6× pellet shows an excellent microstructure of the pores inside the pellet and does not exhibit any large cavities, which is a decisive evidence of a very compact, well made, catalyst pellet. The findings from the SEM photography are very consistent with the flexural strength measurement using the Dynamic Mechanical Analyzer (DMA).

D.3.b New Zealand Halloysite Catalysts

Figure 15:
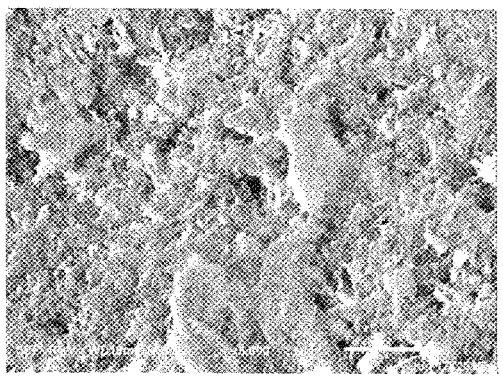
FIG. 15 shows SEM photographs (×5000 magnification) of the supercritically treated New Zealand halloysite catalysts that have gone through 1× (FIG. 15A) extrusion, 3× (FIG. 15B) extrusion, and 6× (FIG. 15C) extrusion, respectively.
Figure 15:
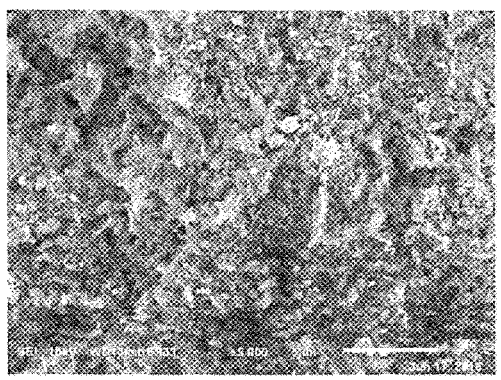
Figure 15:
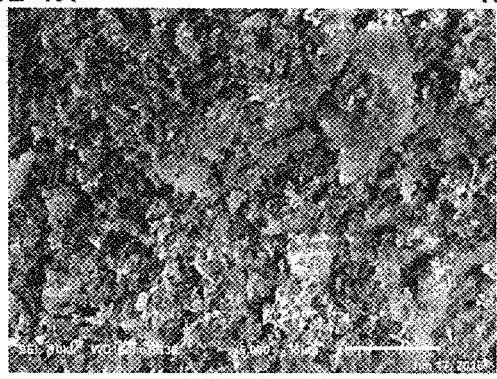
Figure 17:
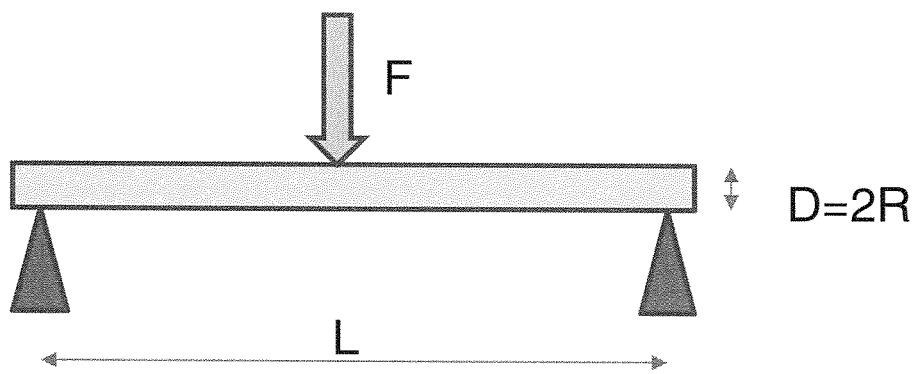
FIG. 17 shows a flexural strength test of catalysts according to ASTM Standard No. C1161-13 and the work by Li. et al., adopted Aug. 1, 2013.

FIG. 15 shows the SEM photographs (with ×5000 magnification) of the supercritically treated New Zealand halloysite catalysts that have gone through 1× extrusion, 3× extrusion, and 6× extrusion, respectively. Please note that ×5000 magnification photographs are shown instead of ×2000 magnification for the New Zealand halloysite catalyst samples, primarily due to its finer particle size distribution.

As also can be seen, there is an obvious improvement in the microstructure of the catalyst in the cases of 3× and 6× extrudates, in comparison to the 1× sample. However, the difference between the 3× and 6× samples is very minimal or undetectable in terms of particle dispersion, presence of large cavities, general compactness. The SEM examination results are also consistent with the flexural strength measurement results using the DMA.

Empirical Rule of Thumb

In industrial catalysis, if a catalyst pellet has a flexural strength of ~1.5 MPa based on the above ASTM test method, then the pellet is considered suitable for adoption in industrial column reactor operation. This is an empirical rule of thumb in the field.

While in accordance with the patent statutes, the best mode and preferred embodiment have been set forth, the scope of the invention is not limited thereto, but rather by the scope of the attached claims.

What is claimed is:

1. A process for producing poly(tetramethylene ether) diacetate comprising the steps of:
   making a morphologically modified acid-based halloysite catalyst comprising,
   subjecting a halloysite catalyst to a supercritical carbon dioxide treatment; said modified halloysite catalysts having an average pore diameter of from about 50 Å to about 500 Å; and
   polymerizing tetrahydrofuran or 3-methyl tetrahydrofuran with acetic anhydride in the presence of said modified halloysite catalysts to produce said poly(tetramethylene ether) diacetate.

2. The process of claim 1, wherein said polymerization temperature is from about 30° C. to about 65° C., wherein the number average molecular weight of said poly(tetramethylene ether) diacetate is from about 500 to about 5,000, and wherein the polydispersity of said poly(tetramethylene ether) diacetate is from about 1.5 to about 6.

3. The process of claim 2, wherein said polymerization temperature is from about 35° C. to about 65° C., wherein said number average molecular weight is from about 650 to about 4,000, and wherein the polydispersity of said poly(tetramethylene ether) diacetate is from about 1.8 to about 5.

4. The process of claim 3, wherein said polymerization temperature is from about 40'C to about 60° C.; wherein said number average molecular weight is from about 1,000 to about 3,000; and wherein said polydispersity is from about 2.0 to about 4.0.

5. The process of claim 1, wherein said acetic anhydride has the formula

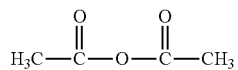

wherein said diacetate derived from said acetic anhydride formula

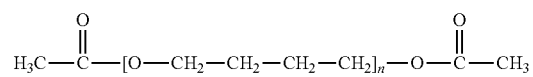

wherein said polymerization temperature is from about 30'C to about 65° C.; and wherein n is from 4 to 60, and wherein the polydispersity of said poly(tetramethylene ether) diacetate is from about 1.5 to about 6.

6. The process of claim 5, wherein said polymerization temperature is from about 35° C. to about 65° C., wherein the polydispersity of said polymerized polymer is from about 1.8 to about 5; and wherein n is from 10 to 40.

7. The process of claim 6, wherein said polymerization temperature is from about 40'C to about 60° C., wherein said polydispersity of said polymer is from about 2.0 to about 4, and wherein n is from 20 to 30.

8. A process for producing poly(tetramethylene ether) diacetate comprising the steps of:
   making a morphologically modified acid-based halloysite catalyst comprising,
   subjecting a halloysite catalyst to a supercritical carbon dioxide treatment; wherein the supercritical treatment temperature is from about 200° C. to about 290° C.; wherein the supercritical treatment pressure is from about 1200 to about 3000 psi; wherein said halloysite catalyst has the formula $Al_2Si_2O_5(OH)_4 \cdot 2H_2O$ wherein the ratio of $SiO_2$ to $Al_2O_3$ is from about 1.7 to about 3.0; wherein the amount of any zeolite compound is about 10% by weight or less based upon the total weight of said halloysite catalyst; said modified halloysite catalysts having an average pore diameter of from about 50 Å to about 500 Å; and
   polymerizing tetrahydrofuran or 3-methyl tetrahydrofuran with acetic anhydride in the presence of said modified halloysite catalysts to produce said poly(tetramethylene ether) diacetate.

9. The process of claim 8, wherein said polymerization temperature is from about 30'C to about 65° C., and wherein the number average molecular weight of said poly(tetramethylene ether) diacetate is from about 500 to about 5,000, and wherein the polydispersity of said poly(tetramethylene ether) diacetate is from about 1.5 to about 6.

10. The process of claim 9, wherein said polymerization temperature is from about 35'C to about 65° C., wherein said number average molecular weight is from about 650 to about 4,000, and wherein the polydispersity of said poly(tetramethylene ether) diacetate is from about 1.8 to about 5.

11. The process of claim 10, wherein said polymerization temperature is from about 40'C to about 60° C.; wherein said number average molecular weight is from about 1,000 to about 3,000; and wherein said polydispersity is from about 2.0 to about 4.0.

12. The process of claim 8, wherein said acetic anhydride has the formula

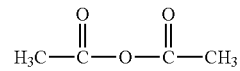

wherein said diacetate derived from said acetic anhydride has the formula

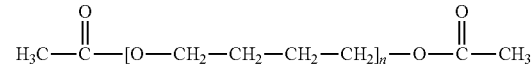

wherein said polymerization temperature is from about 30 to about 65° C., wherein n is from 4 to 60, and wherein the polydispersity of said poly(tetramethylene ether) diacetate is from about 1.5 to about 6.

13. The process of claim 12, wherein said polymerization temperature is from about 35'C to about 65° C., wherein the polydispersity of said polymerized polymer is from about 1.8 to about 5; and wherein n is from 10 to 40.

14. The process of claim 13, wherein said polymerization temperature is from about 40° C. to about 60° C., wherein said polydispersity of said polymer is from about 2.0 to about 4, and wherein n is from 20 to 30.

15. A process for producing poly(tetramethylene ether) diacetate comprising the steps of:
   making a morphologically modified acid-based halloysite catalyst comprising,
   subjecting a halloysite catalyst to a supercritical carbon dioxide treatment; wherein the supercritical treatment temperature is from about 250° C. to about 290° C.; wherein the supercritical treatment pressure is from about 1,400 to about 1,700 psi; wherein said halloysite catalyst has the formula $Al_2Si_2O_5(OH)_4 \cdot 2H_2O$ wherein the ratio of $SiO_2$ to $Al_2O_3$ is from about 1.8 to about 2.3; wherein the amount of any zeolite compound is about 2% by weight or less based upon the total weight of said halloysite catalyst; wherein the average pore diameter of said halloysite catalysts is from about 125 to about 250 angstroms; and polymerizing tetrahydrofuran or 3-methyl tetrahydrofuran with acetic anhydride in the presence of said modified halloysite catalysts to produce said poly(tetramethylene ether) diacetate.

16. The process of claim 15, wherein said polymerization temperature is from about 30'C to about 65° C., and wherein the number average molecular weight of said poly(tetramethylene ether) diacetate is from about 500 to about 5,000, and wherein the polydispersity of said poly(tetramethylene ether) diacetate is from about 1.5 to about 6.

17. The process of claim 16, wherein said polymerization temperature is from about 35° C. to about 65° C., wherein said number average molecular weight is from about 650 to about 4,000, and wherein the polydispersity of said poly (tetramethylene ether) diacetate is from about 1.8 to about 5.

18. The process of claim 17, wherein said polymerization temperature is from about 40'C to about 60° C.; wherein said number average molecular weight is from about 1,000 to about 3,000; and wherein said polydispersity is from about 2.0 to about 4.0.

19. The process of claim 15, wherein said acetic anhydride has the formula

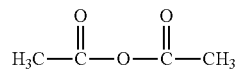

wherein said diacetate derived from said acetic anhydride has the formula

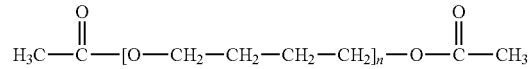

wherein said polymerization temperature is from about 30 to about 65° C.; and wherein n is from 4 to 60.

20. The process of claim 19, wherein said polymerization temperature is from about 40° C. to about 60° C., wherein said polydispersity of said polymer is from about 2.0 to about 4, wherein n is from 20 to 30, and wherein said halloysite catalysts is a Korean halloysite or a New Zealand halloysite.

* * * * *